(12) United States Patent
Pan et al.

(10) Patent No.: US 10,495,948 B2
(45) Date of Patent: Dec. 3, 2019

(54) LENS SYSTEM, ACCESSORY, COMMUNICATION METHOD, AND PROGRAM

(71) Applicant: FUJIFILM Corporation, Tokyo (JP)

(72) Inventors: Yi Pan, Saitama (JP); Junji Hayashi, Saitama (JP); Kazufumi Sugawara, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 115 days.

(21) Appl. No.: 15/942,561

(22) Filed: Apr. 1, 2018

(65) Prior Publication Data

US 2018/0224720 A1    Aug. 9, 2018

Related U.S. Application Data

(63) Continuation of application No. PCT/JP2016/078154, filed on Sep. 26, 2016.

(30) Foreign Application Priority Data

Oct. 20, 2015    (JP) ................... 2015-206718

(51) Int. Cl.
*G02B 7/02*    (2006.01)
*G03B 17/00*    (2006.01)
(Continued)

(52) U.S. Cl.
CPC ......... *G03B 17/14* (2013.01); *H04N 5/23209* (2013.01)

(58) Field of Classification Search
CPC ............................ G03B 17/14; H04N 5/23209
(Continued)

(56) References Cited

U.S. PATENT DOCUMENTS 7,522,828 B2 *    4/2009    Doi ................. G03B 17/56
                                                 396/71
2012/0033955 A1    2/2012    Okada

FOREIGN PATENT DOCUMENTS

JP    H07234432    9/1995
JP    2769524    6/1998
(Continued)

OTHER PUBLICATIONS

"International Search Report (Form PCT/ISA/210) of PCT/JP2016/078154," dated Dec. 20, 2016, with English translation thereof, pp. 1-5.

(Continued)

*Primary Examiner* — William Choi
(74) *Attorney, Agent, or Firm* — JCIPRNET

(57) ABSTRACT

Provided are a lens system, an accessory, a communication method, and a non-transitory recording medium readable by a computer for recording a program capable of accurately specifying an accessory without providing dedicated terminals for an interchangeable lens and the accessory. The lens system is a lens system including an interchangeable lens 100 and an accessory 300, the interchangeable lens includes a lens control unit that performs bidirectional data communication with the accessory necessary for acquisition of at least identification information of the accessory before starting data communication with the camera body, and the accessory includes an accessory control unit to which a power supply terminal and an input and output terminal among a plurality of signal lines are connected, and that replies with identification information of the accessory when the accessory control unit receives a request for acquisition of the identification information of the accessory from the interchangeable lens.

20 Claims, 11 Drawing Sheets

(51) Int. Cl.
*G03B 17/14* (2006.01)
*H04N 5/232* (2006.01)
(58) Field of Classification Search
USPC .......... 359/811, 819, 827; 396/71, 529, 530
See application file for complete search history.

(56) References Cited

FOREIGN PATENT DOCUMENTS

| | | |
|---|---|---|
| JP | 2006171392 | 6/2006 |
| JP | 2010261984 | 11/2010 |
| JP | 2012037692 | 2/2012 |

OTHER PUBLICATIONS

"International Preliminary Report on Patentability (Form PCT/IPEA/409) of PCT/JP2016/078154," dated Jun. 6, 2017, with English translation thereof, pp. 1-20.

* cited by examiner

LENS SYSTEM, ACCESSORY, COMMUNICATION METHOD, AND PROGRAM

CROSS-REFERENCE TO RELATED APPLICATIONS

This application is a Continuation of PCT International Application No. PCT/JP2016/078154 filed on Sep. 26, 2016, which claims priority under 35 U.S.C. § 119(a) to Japanese Patent Application No. 2015-206718 filed on Oct. 20, 2015. Each of the above application(s) is hereby expressly incorporated by reference, in its entirety, into the present application.

BACKGROUND OF THE INVENTION

1. Field of the Invention

The present invention relates to a lens system, an accessory, a communication method, and a program, and more particularly, to a technology of a lens system, an accessory, a communication method, and a program that are suitably used for an interchangeable lens camera.

2. Description of the Related Art

In the related art, an interchangeable lens camera including an interchangeable lens that is a lens detachable and attachable from a camera body has become widespread. In general, a plurality of types of interchangeable lenses are prepared, and a user can select the interchangeable lens according to his or her preference and mount the interchangeable lens on the camera body. The camera body of the interchangeable lens camera acquires lens data of the mounted interchangeable lens by communicating with the interchangeable lens, and performs a process suitable for the mounted interchangeable lens to acquire a captured image with high image quality.

Further, accessories for realizing imaging desired by a user by being mounted on an interchangeable lens as represented by a teleconversion lens are widespread. In a case where the accessory is mounted on the interchangeable lens, the camera body realizes acquisition of a high-quality captured image by acquiring lens data corrected for a case where the accessory is mounted.

For example, Japanese Patent No. 2769524 discloses a technology for performing communication of lens data corrected for a case where an accessory is mounted, using a first junction for communication between an interchangeable lens and an accessory (adapter) and using a second junction provided separately from the first junction for communication between the interchangeable lens and a camera body. Further, in the technology described in Japanese Patent No. 2769524, a determination as to mounting of the accessory and specifying of a type of accessory are performed according to input levels of terminals.

SUMMARY OF THE INVENTION

However, in the interchangeable lens described in Japanese Patent No. 2769524, it is necessary to provide the first junction for performing communication with the camera body and the second junction for performing communication with the accessory. That is, in the interchangeable lens described in Japanese Patent No. 2769524, it is necessary to provide a dedicated terminal for performing communication with the camera body, and it is necessary to provide a dedicated terminal for performing communication with the accessory.

Further, in the technology described in Japanese Patent No. 2769524, since the type of the accessory is specified according to the input level of the terminal. Since a variation in the input level of the terminals is limited, types of the accessories that can be specified are limited.

The present invention has been made in view of the above circumstances, and an object of the present invention is to provide a lens system, an accessory, a communication method, and a program capable of accurately specifying an accessory without providing dedicated terminals for an interchangeable lens and the accessory.

In order to achieve the object, a lens system according to an aspect of the present invention is a lens system including an interchangeable lens detachable and attachable from a camera body including a first mount having a plurality of first terminals including a power supply terminal and an input and output terminal for bidirectional serial communication, and an accessory mounted between the camera body and the interchangeable lens, wherein: the interchangeable lens includes a second mount having a plurality of second terminals respectively electrically connected to the plurality of first terminals arranged on the first mount via the accessory; and a lens control unit that performs bidirectional data communication with the accessory necessary for acquisition of at least identification information of the accessory before starting data communication with the camera body, and the accessory includes a third mount having a plurality of third terminals respectively connected to the plurality of first terminals in a state where the third mount is mounted on the first mount; a fourth mount having a plurality of fourth terminals respectively connected to the plurality of second terminals in a state where the fourth mount is mounted on the second mount; a plurality of signal lines that electrically connect the plurality of third terminals to the plurality of fourth terminals, respectively; and an accessory control unit to which the power supply terminal and the input and output terminal among the plurality of signal lines are connected, the accessory control unit replying with identification information of the accessory when the accessory control unit receives a request for acquisition of the identification information of the accessory from the interchangeable lens.

According to this aspect, the interchangeable lens and the accessory can be electrically connected without providing dedicated terminals. That is, the interchangeable lens is electrically connected to the camera body via the accessory, and the accessory is electrically connected to the interchangeable lens using signal lines that electrically connect the third mount bonded to the camera body and the fourth mount bonded to the interchangeable lens. Thus, in the aspect, the interchangeable lens and the accessory can be electrically connected to each other using terminals used for communication between the interchangeable lens and the camera body. Further, according to the aspect, the interchangeable lens transmits a request for acquisition of identification information of the accessory to the accessory, and the accessory replies with the identification information. Thus, in the aspect, it is possible to accurately specify the accessory on which the interchangeable lens is mounted, and to accurately specify an accessory with a large number of variations.

Preferably, in a case where there is a request for lens data from the camera body, the lens control unit transfers first lens data of the interchangeable lens optimized according to optical characteristics of the accessory to the camera body in a case where the identification information of the accessory is acquired, and transfers second lens data of the interchangeable lens to the camera body in a case where the identification information of the accessory is not acquired.

According to this aspect, in a case where the interchangeable lens acquires the identification information of the accessory, first lens data optimized according to optical characteristics of the accessory is transferred, and in a case where the interchangeable lens does not acquire the identification information of the accessory, second lens data of the interchangeable lens is transferred to the camera body. Thus, in the aspect, the lens data can be transmitted to the camera body corresponding to a case where the interchangeable lens can acquire the identification information of the accessory and a case where the interchangeable lens cannot acquire the identification information of the accessory.

Preferably, the interchangeable lens includes a communication switching unit that determines whether or not a state capable of performing communication with the accessory is to be continued after acquiring identification information of the accessory on the basis of a polarity of a signal of specific terminals other than the power supply terminal and the input and output terminal among the plurality of second terminals corresponding to the plurality of first terminals, and performs communication switching between data communication between the camera body and the interchangeable lens and data communication between the interchangeable lens and the accessory using at least one of the specific terminals in a case where the state capable of performing communication with the accessory is continued.

According to this aspect, after the interchangeable lens acquires the identification information of the accessory using the specific terminal other than the power supply terminal and the input and output terminal among the plurality of terminals, the interchangeable lens determines whether or not to continue a state of a communication with the accessory, and when the communication between the accessory and the interchangeable lens is continued, communication switching between data communication between the camera body and the interchangeable lens and data communication between the interchangeable lens and the accessory is performed using at least one specific terminal. Thus, in the aspect, the data communication between the camera body and the interchangeable lens and the data communication between the interchangeable lens and the accessory are performed rapidly and accurately.

Preferably, the specific terminal is a busy signal terminal for a busy signal for transferring a notification of an operation state from one of the interchangeable lens and the camera body to the other.

According to this aspect, it is possible to determine whether or not to continue a state in which communication with the accessory can be performed using the busy signal, and switching between the data communication between the camera body and the interchangeable lens and data communication between the interchangeable lens and the accessory is performed. Thus, in the aspect, it is possible to effectively use an existing busy signal terminal for a busy signal without newly providing a dedicated terminal.

Preferably, the specific terminal is a busy signal terminal for a busy signal for transferring a notification of an operation state from one of the interchangeable lens and the camera body to the other, and a synchronization signal terminal for a synchronization signal.

According to this aspect, it is possible to determine whether or not to continue a state in which communication with the accessory can be performed using the busy signal and the synchronization signal, and switching between data communication between the camera body and the interchangeable lens and data communication between the interchangeable lens and the accessory is performed. Thus, in the aspect, it is possible to determine the continuation of the state in which the interchangeable lens and the accessory can perform communication using existing busy and synchronous signals, and switching between communication between the camera body and the interchangeable lens and communication between the interchangeable lens and the accessory is performed.

Preferably, in a case where the communication switching unit detects that the polarity of the synchronization signal input from the synchronization signal terminal is a first polarity when power supply from the camera body is started, and switching from the first polarity to a second polarity different from the first polarity, the communication switching unit switches the first polarity of the busy signal for transferring a notification of an operation state from the interchangeable lens to the camera body to the second polarity different from the first polarity, and enables data communication between the interchangeable lens and the accessory in a period in which the synchronization signal has the second polarity and the busy signal has the second polarity.

According to this aspect, it is possible to control data communication between the interchangeable lens and the accessory by switching between the polarity of the synchronization signal and the polarity of the busy signal. That is, the communication switching unit of the interchangeable lens enables data communication between the interchangeable lens and the accessory in a period in which the synchronization signal has the second polarity and the busy signal has the second polarity. Thus, in the aspect, communication between the interchangeable lens and the accessory can be controlled accurately and rapidly using an existing busy signal terminal for a busy signal and an existing synchronous signal terminal for a synchronization signal.

Preferably, the accessory control unit performs a communication end setting to disable data communication with the interchangeable lens when the accessory control unit detects that the busy signal is switched to the first polarity.

According to this aspect, when it is detected that the busy signal is switched to the first polarity, the communication end setting is performed to disable the data communication with the interchangeable lens. Thus, in the aspect, it is possible to control communication between the interchangeable lens and the accessory using an existing busy signal terminal for a busy signal.

Preferably, in a case where the accessory control unit unreceives a request for acquisition of the identification information of the accessory from the interchangeable lens within a predetermined period after the start of power supply from the camera body, the accessory control unit performs a communication end setting to disable data communication with the interchangeable lens.

According to this aspect, in a case where a request for acquisition of the identification information of the accessory cannot be received from the interchangeable lens within a predetermined period after the start of power supply from the camera body, the communication end setting is performed to disable data communication with the interchangeable lens. Thus, in the aspect, even in a case where an accessory that cannot communicate with the interchangeable lens is mounted, communication between the interchangeable lens and the accessory is automatically disabled, and therefore, the lens system is operated without causing an error.

Preferably, the communication switching unit determines whether or not access to the accessory is to be continued, and switches the first polarity of the signal of the busy signal terminal to a second polarity different from the first polarity and enables the data communication between the interchangeable lens and the accessory in a case where the communication switching unit determines that the access is to be continued.

According to the aspect, when there is a request for continuation of access to the accessory from the camera body, the polarity of the signal of the terminal of the busy signal is switched from the first polarity to the second polarity, and an enabled state of data communication between the interchangeable lens and the accessory is maintained. Thus, in the aspect, communication between the interchangeable lens and the accessory can be enabled, and then, communication between the interchangeable lens and the accessory can be performed.

Preferably, in a case where the communication switching unit detects that a polarity of a synchronization signal input from the synchronization signal terminal is the second polarity when power supply is started from the camera body, the communication switching unit switches a polarity of the signal of the busy signal terminal to the second polarity, and enables data communication between the interchangeable lens and the accessory.

According to this aspect, in a case where it is detected that a polarity of a synchronization signal input from the synchronization signal terminal is the second polarity when power supply is started from the camera body, the polarity of the signal of the busy signal terminal is switched to the second polarity, and data communication between the interchangeable lens and the accessory is enabled. Thus, in the aspect, it is possible to enable the data communication between the interchangeable lens and the accessory, and thereafter, perform communication between the interchangeable lens and the accessory.

An accessory according to another aspect of the present invention is an accessory that is mounted between a camera body including a first mount having a plurality of first terminals including a power supply terminal and an input and output terminal for bidirectional serial communication, and an interchangeable lens including a second mount having a plurality of second terminals that are respectively electrically connected to the plurality of first terminals arranged in the first mount, the accessory comprising: a third mount having a plurality of third terminals respectively connected to the plurality of first terminals in a state where the third mount is mounted on the first mount; a fourth mount having a plurality of fourth terminals respectively connected to the plurality of second terminals in a state where the fourth mount is mounted on the second mount; a plurality of signal lines that electrically connect the plurality of third terminals to the plurality of fourth terminals, respectively; and an accessory control unit to which the power supply terminal and the input and output terminal among the plurality of signal lines are connected, the accessory control unit replying with identification information of the accessory when the accessory control unit receives a request for acquisition of the identification information of the accessory from the interchangeable lens.

According to this aspect, the accessory can be electrically connected to the interchangeable lens without providing dedicated terminals. That is, the accessory is electrically connected to the interchangeable lens using signal lines that electrically connect the third mount bonded to the camera body and the fourth mount bonded to the interchangeable lens. Thus, according to this aspect, the accessory receives the request for acquisition of identification information of the accessory from the interchangeable lens, and replies with the identification information. Thus, in the aspect, it is possible to accurately specify the mounted accessory, and to accurately specify an accessory with a large number of types of variations.

Preferably, the accessory control unit is connected to a signal line connected to the input and output terminal among the plurality of signal lines and a signal line connected to a specific terminal other than the power supply terminal and the input and output terminal, and performs a process of stopping data communication with the interchangeable lens or a process of starting the data communication with the interchangeable lens on the basis of a polarity of a signal of the specific terminal.

According to this aspect, since the process of stopping the data communication with the interchangeable lens or the process of starting the data communication with the interchangeable lens on the basis of the polarity of the signal of the specific terminal other than the power supply terminal and the input and output terminal is performed, it is possible to control the stop or start of data communication by switching between the polarities of the signal of the specific terminal. Thus, in the embodiment, switching between data communication between the camera body and the interchangeable lens and data communication between the interchangeable lens and the accessory is performed rapidly and accurately.

Preferably, the specific terminal is a busy signal terminal for a busy signal for transferring a notification of an operation state from one of the interchangeable lens and the camera body to the other.

According to this aspect, the process of stopping the data communication with the interchangeable lens or the process of starting the data communication with the interchangeable lens is performed using the busy signal. Accordingly, in the aspect, it is possible to perform switching communication between the interchangeable lens and the accessory using an existing busy signal terminal for a busy signal.

Preferably, the specific terminal is a busy signal terminal for a busy signal for transferring a notification of an operation state from one of the interchangeable lens and the camera body to the other, and a synchronization signal terminal for a synchronization signal.

According to this aspect, the process of stopping the data communication with the interchangeable lens or the process of starting the data communication with the interchangeable lens using the busy signal and the synchronization signal. Thus, in the aspect, switching of communication between the interchangeable lens and the accessory can be performed using existing busy and synchronization signals.

Preferably, the accessory control unit performs a process of stopping data communication with the interchangeable lens in a case where the accessory control unit detects switching to a first polarity that is a polarity different from a second polarity that is a polarity of a busy signal input from the busy signal terminal, the busy signal transferring a notification of an operation state from the interchangeable lens to the camera body, and performs a process of starting data communication with the interchangeable lens when the accessory control unit detects switching to the second polarity.

According to this aspect, it is possible to control the data communication between the interchangeable lens and the accessory by switching between the polarities of the busy signal. Thus, in the embodiment, it is possible to control communication between the interchangeable lens and the accessory using an existing busy signal terminal for a busy signal.

Preferably, in a case where the accessory control unit unreceives a request for acquisition of identification information of the accessory from the interchangeable lens within a predetermined period after start of power supply from the camera body, the accessory control unit performs a communication end setting to disable data communication with the interchangeable lens.

According to this aspect, in a case where the request for acquisition of the identification information of the accessory cannot be received from the interchangeable lens within a predetermined period after the start of power supply from the camera body, a communication end setting for disabling data communication with the interchangeable lens is performed. Thus, in the aspect, even in a case where the accessory is mounted on the interchangeable lens not compatible with the mounting of the accessory, the accessory can normally operate without causing an error.

Preferably, the accessory is a teleconversion lens, a wide conversion lens, an antivibration adapter, a macro extension tube, or a mount adapter.

A communication method of a lens system that is another aspect of the present invention is a communication method of a lens system including an interchangeable lens detachable and attachable from a camera body including a first mount having a plurality of first terminals including a power supply terminal and an input and output terminal for bidirectional serial communication, the interchangeable lens including a second mount having a plurality of second terminals respectively electrically connected to the plurality of first terminals arranged on the first mount via an accessory, and the accessory mounted between the camera body and the interchangeable lens, the communication method comprising: a step of transmitting, by a lens control unit of the interchangeable lens, a request for acquisition of identification information of the accessory before data communication with the camera body is started; a step of determining whether or not a state capable of performing communication with the accessory is to be continued after acquiring identification information of the accessory, and performing communication switching between data communication between the camera body and the interchangeable lens and data communication between the interchangeable lens and the accessory using at least one of the specific terminals in a case where the state capable of performing communication with the accessory is continued, by the communication switching unit; and a step of transmitting, by an accessory control unit of the accessory, the identification information of the accessory to the lens control unit when an acquisition request for the identification information of the accessory is received from the interchangeable lens.

Preferably, the communication method further comprises a step in which, in a case where data communication between the interchangeable lens and the camera body is enabled and there is a request for lens data from the camera body to the interchangeable lens, the lens control unit transfers first lens data of the interchangeable lens optimized according to optical characteristics of the accessory to the camera body in a case where the identification information of the accessory is acquired, and transfers second lens data of the interchangeable lens to the camera body in a case where the identification information of the accessory is not acquired.

A non-transitory recording medium readable by a computer for recording an interchangeable lens program according to another aspect of the present invention is detachable and attachable from a camera body including a first mount having a plurality of first terminals including a power supply terminal and an input and output terminal for bidirectional serial communication, the interchangeable lens including a second mount having a plurality of second terminals respectively electrically connected to the plurality of first terminals arranged on the first mount via an accessory and being mounted on the camera body directly or mounted on the camera body via the accessory, the program causing a computer in an interchangeable lens to realize a function of performing bidirectional data communication necessary for acquisition of at least identification information of the accessory before data communication with the camera body is started; and a function of determining whether or not a state capable of performing communication with the accessory is to be continued after acquiring identification information of the accessory, and performing communication switching between data communication between the camera body and the interchangeable lens and data communication between the interchangeable lens and the accessory using at least one of the specific terminals in a case where the state capable of performing communication with the accessory is continued.

Preferably, the non-transitory recording medium readable by a computer for recording the program causes the computer in the interchangeable lens to realize a function of transferring first lens data of the interchangeable lens optimized according to optical characteristics of the accessory to the camera body in a case where the identification information of the accessory is acquired, and transferring second lens data of the interchangeable lens to the camera body in a case where the identification information of the accessory is not acquired, in a case where data communication with the camera body is enabled and there is a request for lens data from the camera body.

According to the present invention, the accessory can be electrically connected to the interchangeable lens using the terminal used for communication between the interchangeable lens and the camera body, and since the accessory is specified by the identification information, accessories with a large number of types of variations can be specified accurately.

DESCRIPTION OF THE PREFERRED EMBODIMENTS

Hereinafter, embodiments of the present invention will be described in detail with reference to the accompanying drawings. Note that in the embodiment, a case where an accessory in the present invention is a teleconverter (a teleconversion lens) will be described. However, in the present invention, the accessory may be a wide converter (a wide conversion lens), a mount adapter, an antivibration adapter, or a macro extension tube. In the following description, "teleconverter" may be appropriately abbreviated as a "teleconverter".

Figure 1:
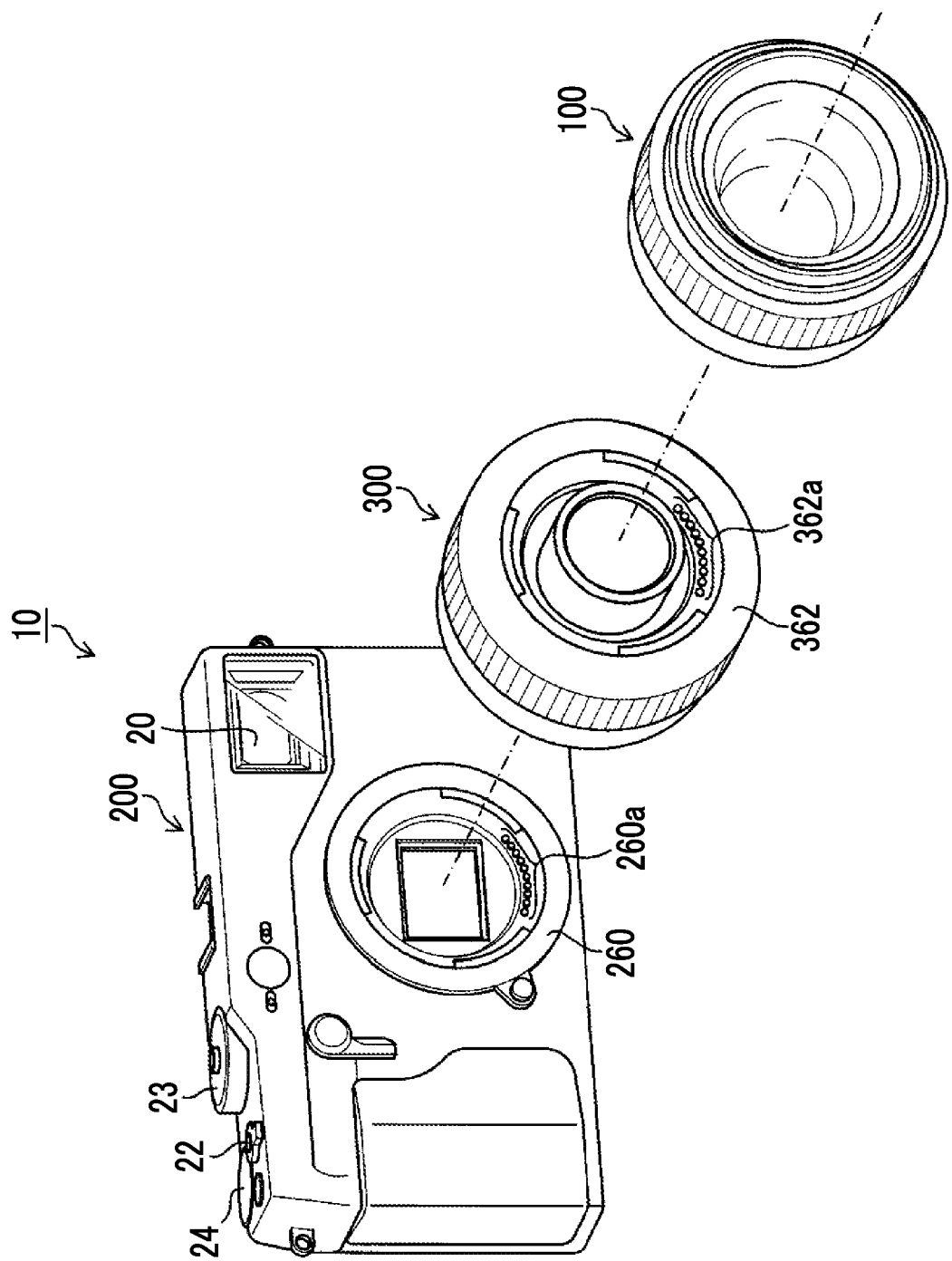
FIG. 1 is an external perspective view of a camera system according to an embodiment of the present invention.
Figure 2:
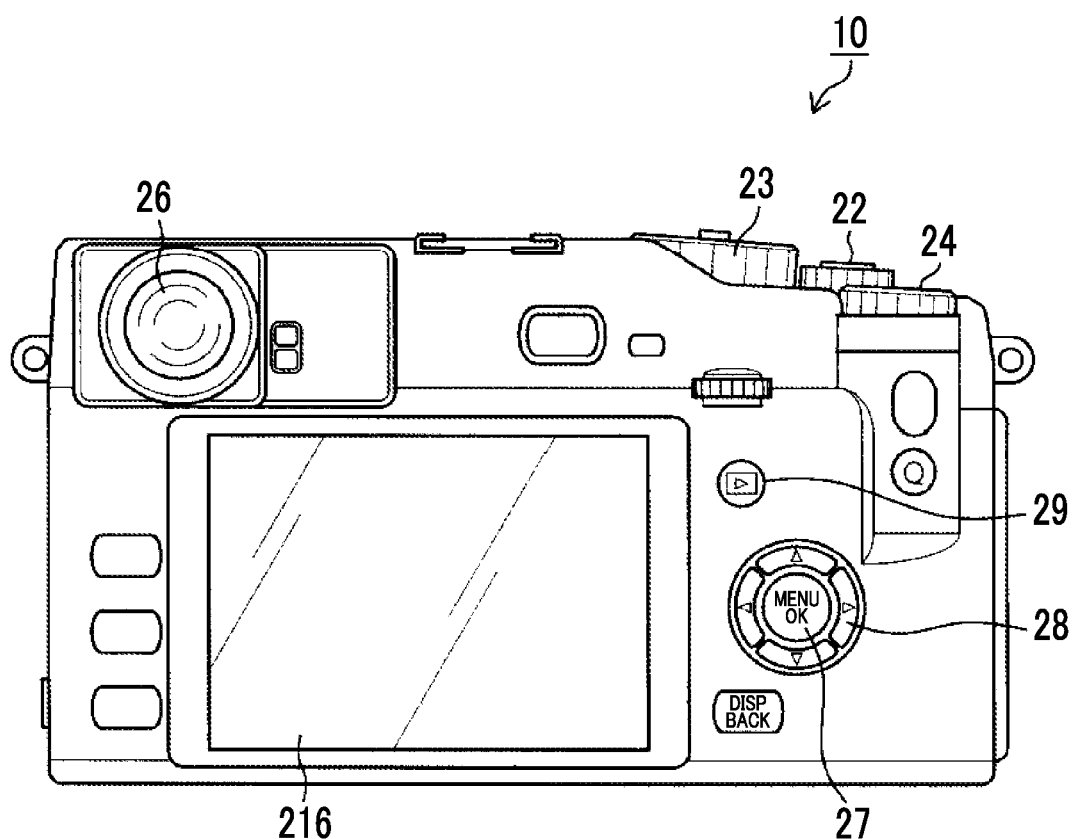
FIG. 2 is a rear view of the camera system according to the embodiment of the present invention.
Figure 3:
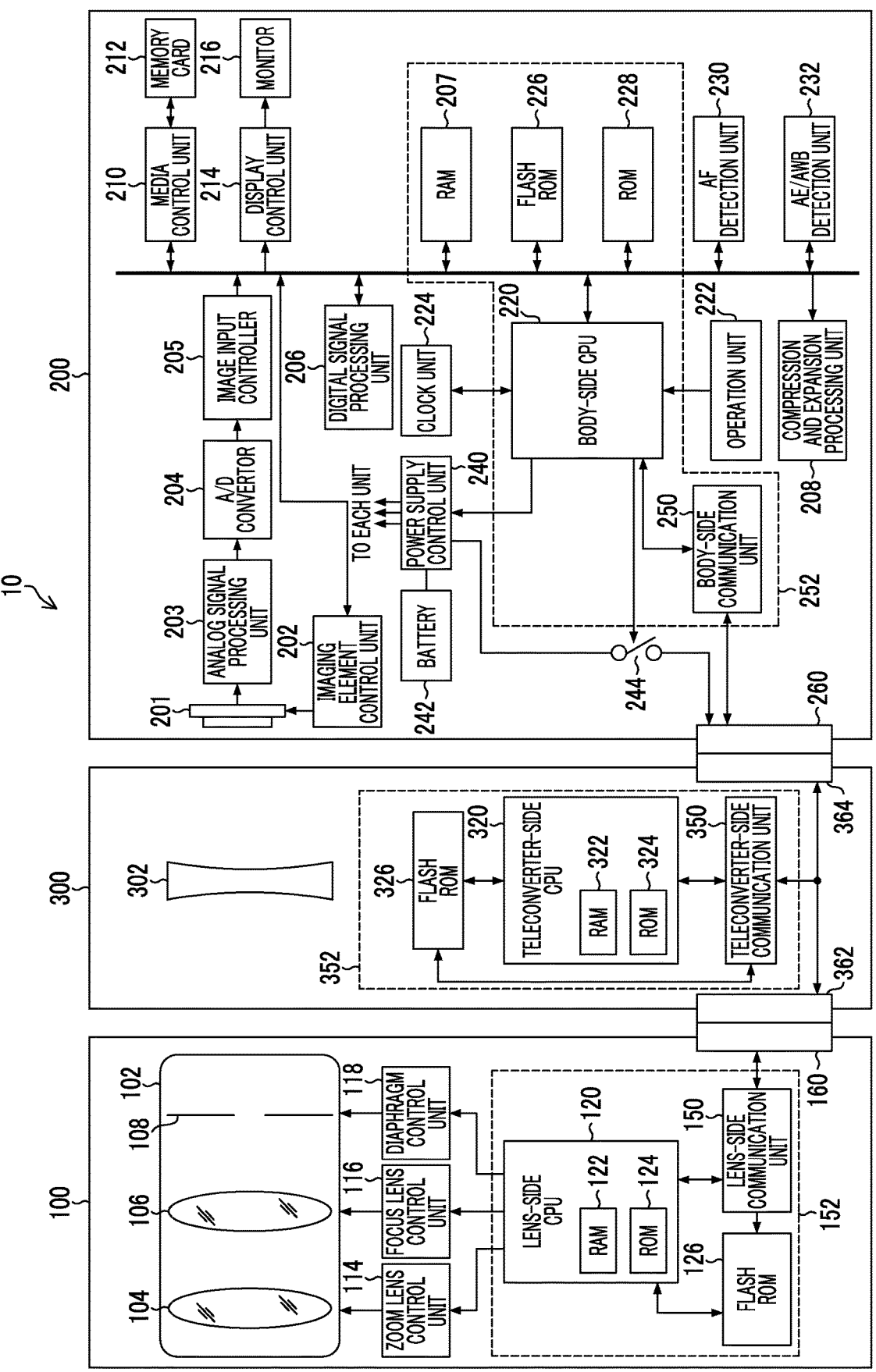
FIG. 3 is a block diagram illustrating a main configuration of the camera system according to the embodiment of the present invention.

FIGS. 1 and 2 are a perspective view and a rear view illustrating an appearance of a camera system (an imaging device 10) according to an embodiment of the present invention, and FIG. 3 is a block diagram illustrating a main configuration of the imaging device 10.

As illustrated in FIGS. 1, 2, and 3, an imaging device 10 includes an interchangeable lens 100, a camera body 200, and a teleconverter 300. The teleconverter 300 includes a distal end side mount (a fourth mount) 362 and a proximal end side mount (a third mount) 364 (FIG. 3). The interchangeable lens 100 includes a lens mount (a second mount) 160 (FIG. 3) detachably attached to the distal end side mount 362 of the teleconverter 300. The interchangeable lens 100 of this example has a cylindrical shape, and the lens mount 160 is formed at a proximal end of the interchangeable lens 100. The camera body 200 includes a body mount (a first mount) 260 to which the proximal end side mount 364 (FIG. 3) of the teleconverter 300 is detachably attached. The camera body 200 of this example has a box shape, and the body mount 260 is formed substantially at a center of a front face of the camera body 200. The lens mount 160 of the interchangeable lens 100 is mounted on the distal end side mount 362 of the teleconverter 300 and the proximal end side mount 364 of the teleconverter 300 is mounted on the body mount 260 of the camera body 200 so that the interchangeable lens 100 and the teleconverter 300 are detachably mounted on the camera body 200. Note that the interchangeable lens 100 and the teleconverter 300 constitute the lens system according to the present invention.

Note that although a case where the interchangeable lens 100 is mounted on the camera body 200 via the teleconverter 300 will be described in the embodiment, the interchangeable lens 100 can be directly mounted on the camera body 200.

Figure 4:
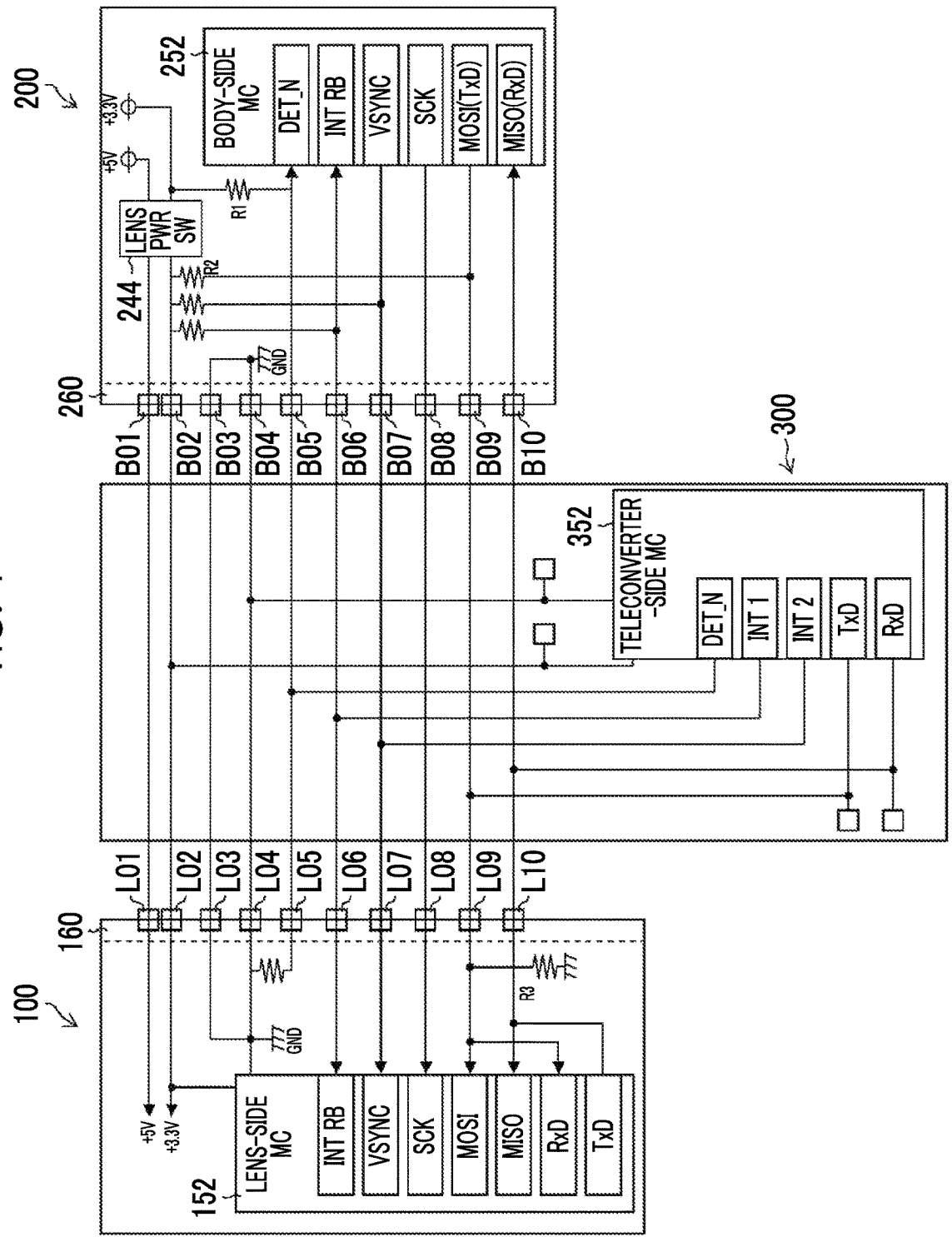
FIG. 4 is a diagram illustrating a configuration of a communication signal line in the camera system according to the embodiment of the present invention.

The lens mount 160, the body mount 260, the distal end side mount 362 and the proximal end side mount 364 of the teleconverter 300 are each provided with a plurality of terminals as contact points. In FIG. 1, a plurality of terminals 260*a* (body-side terminals) of the body mount 260 and a plurality of terminals 362*a* of the distal end side mount 362 are illustrated. In a case where the lens mount 160 is mounted on the distal end side mount 362 and the proximal end side mount 364 is mounted on the body mount 260, the mutual terminals of the lens mount 160, the body mount 260, the distal end side mount 362, and the proximal end side mount 364 are brought into contact with each other for conduction (FIGS. 3 and 4). In this example, the plurality of terminals are provided in each of the body mount 260, the lens mount 160, the distal end side mount 362, and the proximal end side mount 364 along a circumferential direction of the interchangeable lens 100.

An optical finder window 20 is mainly provided on the front face of the camera body 200. A shutter release button 22, a shutter speed dial 23, and an exposure correction dial 24 are mainly provided on a top surface of the camera body 200.

The shutter release button 22 is operation means for inputting an instruction to start imaging, and is configured as a two-step stroke type switch including so-called "half press" and "full press". In the imaging device 10, in a case where an S1 ON signal is output by half-pressing the shutter release button 22 (an operation of pressing the shutter release button 22 until the middle of a stroke), and an S2 ON signal is output by further fully pressing the shutter release button 22 (a full stroke pressing operation) from the half-press. In a case where the S1 ON signal is output, an imaging preparation process such as automatic focusing (AF process) and automatic exposure control (AE process) is executed, and in a case where the S2 ON signal is output, an imaging process is executed. Further, in the case of a video imaging mode, in a case where the shutter release button 22 is full-pressed, a video recording mode starts.

Note that the shutter release button 22 is not limited to the form of the 2-step stroke type switch including half press and full press, but the S1 ON signal and the S2 ON signal may be output through one operation, or individual switches may be provided to output the S1 ON signal or the S2 ON signal. Further, in a form in which an operation instruction is performed by a touch panel or the like, the operation means may output an operation instruction by an area corresponding to the operation instruction displayed on a screen of the touch panel being touched. In the present invention, a form of the operation means is not limited thereto as long as the operation means instructs the imaging preparation process or the imaging process. Further, the imaging preparation process and the imaging process may be continuously executed through an operation instruction in one operation means.

A user performs adjustment of a shutter speed using the shutter speed dial 23 and performs correction of exposure using the exposure correction dial 24.

FIG. 2 is a rear view of the imaging device 10. A monitor 216, an eyepiece portion 26 of an optical finder, a MENU/OK key 27, a cross key 28, a playback button 29, and the like are mainly provided on a back surface of the camera body 200, as illustrated in FIG. 2.

The monitor 216 displays a live view image, displays a captured image in a case where the playback button 29 is pressed, or displays a captured video. Further, the monitor 216 appropriately displays a message for requesting the user to input instructions or make a confirmation at the time of data acquisition or updating of the interchangeable lens 100 or the teleconverter 300.

Further, the user can perform various settings of the imaging device 10 using the MENU/OK key 27 and the cross key 28. For example, the user can perform switching between a still image capturing mode and a video imaging mode, and setting of whether or not specific image processing (a resolution enhancement process such as a point image restoration process) is executed, or data acquisition or updating of the interchangeable lens 100 or the teleconverter 300 using the MENU/OK key 27 and the cross key 28.

FIG. 3 is a block diagram illustrating an overall configuration of the imaging device 10.

<Configuration of Interchangeable Lens>

The interchangeable lens 100 includes an imaging optical system 102 (a zoom lens 104, a focus lens 106, and a diaphragm 108), a zoom lens control unit 114, a focus lens control unit 116, a diaphragm control unit 118, a lens-side central processing unit (CPU) 120, a flash read only memory (flash ROM) 126, a lens-side communication unit 150, and a lens mount 160. The lens-side microcomputer (MC) 152 includes a lens-side CPU 120, a flash ROM 126, and a lens-side communication unit 150.

The imaging optical system 102 includes the zoom lens 104, the focus lens 106, and the diaphragm 108. The zoom lens control unit 114 controls a position of the zoom lens 104 according to a command from the lens-side CPU 120. The focus lens control unit 116 controls a position of the focus lens 106 according to a command from the lens-side CPU 120. The diaphragm control unit 118 controls a diaphragm area of the diaphragm 108 according to a command from the lens-side CPU 120.

The lens-side CPU 120 is a central processing unit (CPU) of the interchangeable lens 100, and includes a read only memory (ROM) 124 and a random access memory (RAM) 122 built thereinto.

The flash ROM 126 is a nonvolatile memory that stores firmware or lens data of the interchangeable lens 100 downloaded from the camera body 200 or acquired via a recording medium or a network, a serial number (individual identification information) of the interchangeable lens 100, and the like.

The lens-side CPU 120 controls each unit of the interchangeable lens 100 using the RAM 122 as a work area according to a control program (firmware) stored in the ROM 124 or the flash ROM 126. With this control program, a serial number unique to the combination of the interchangeable lens 100 and the teleconverter 300 or lens data related to the combination is generated, as will be described in detail below.

The lens-side communication unit 150 performs communication with the camera body 200 and the teleconverter 300 via a plurality of signal terminals provided on the lens mount 160 in a state in which the interchangeable lens 100 is mounted on the camera body 200 via the teleconverter 300.

<Configuration of Camera Body>

The camera body 200 includes an imaging element (CMOS type or CCD type) 201, an imaging element control unit 202, an analog signal processing unit 203, an analog/digital (A/D) converter unit 204, an image input controller 205, a digital signal processing unit 206, a RAM 207, a compression and expansion processing unit 208, a media control unit 210, a memory card 212, a display control unit 214, a monitor 216, a body-side CPU (a body-side control unit) 220, an operation unit 222, a clock unit 224, a flash ROM 226, a ROM 228, an automatic focus (AF) detection unit 230, an automatic exposure/automatic white balance (AE/AWB) detection unit 232, a power control unit 240, a battery 242, a body-side communication unit 250, and a body mount 260. A body-side microcomputer (MC) 252 includes the body-side CPU 220, the RAM 207, the ROM 228, the flash ROM 226, and the body-side communication unit 250. Note that although the imaging element 201 is installed in the camera body 200 in FIG. 3, the present invention is not limited thereto. The imaging element 201 may be installed, for example, inside the interchangeable lens 100.

The imaging element 201 includes an image sensor that images a subject. An optical image of the subject formed on a light reception surface of the imaging element 201 by the imaging optical system 102 of the interchangeable lens 100 is converted into an electric signal by the imaging element 201. Examples of the imaging element 201 include a complementary metal oxide semiconductor (CMOS) type image sensor, and a charge coupled device (CCD) type image sensor.

The imaging element control unit 202 controls imaging timing, exposure time, or the like of the imaging element 201 according to a command of the body-side CPU 220.

The analog signal processing unit 203 performs various types of analog signal processing on an analog image signal obtained by the imaging element 201 imaging the subject. The analog signal processing unit 203 of this example includes, for example, a sample and hold circuit, a color separation circuit, and a gain adjustment circuit.

The A/D converter 204 converts an analog image signal output from the analog signal processing unit 203 into a digital image signal.

The image input controller 205 temporarily stores the digital image signal output from the A/D converter 204 in the RAM 207 as image data. In a case in which the imaging element 201 is a CMOS-type image sensor, the A/D converter 204 is often built in the imaging element 201. Note that the analog signal processing unit 203, the A/D converter 204, and the image input controller 205 constitute an analog front end (AFE).

The digital signal processing unit 206 performs various types of digital signal processing on the image data stored in the RAM 207. The digital signal processing unit 206 in this example includes, for example, a brightness and color difference signal generation circuit, a gamma correction circuit, a sharpness correction circuit, a contrast correction circuit, a white balance correction circuit, and a resolution enhancement processing circuit (a point image restoration process circuit).

The compression and expansion processing unit 208 performs a compression process on uncompressed image data stored in the RAM 207. Further, the compression and expansion processing unit 208 performs an expansion process on the compressed image data.

The media control unit 210 performs control to record the image data compressed by the compression and expansion processing unit 208 in the memory card 212. Further, the media control unit 210 performs control to read the compressed image data from the memory card 212.

The display control unit 214 performs control to display the uncompressed image data stored in the RAM 207 on the monitor 216. For the monitor 216, a liquid crystal monitor or an organic electronic luminescence (EL) monitor may be adopted.

In a case in which a live view image is displayed on the monitor 216, a digital image signal continuously generated by the digital signal processing unit 206 is temporarily stored in the RAM 207. The display control unit 214 converts the digital image signal temporarily stored in this RAM 207 to have a signal format for a display, and sequentially outputs the resultant signal to the monitor 216. Accordingly, the captured image is displayed on the monitor 216 in real time, such that imaging can be performed using the monitor 216 as an electronic finder.

In a case in which imaging of the subject and recording of the image of the subject are performed, AE control and AF control are performed under the control of the body-side CPU 220 by half press of the shutter release button 22, and imaging is performed by full press. An image acquired by imaging is compressed in a predetermined compression format (for example, a Joint Photographic Experts Group (JPEG) format in the case of a still image or H264 in the case of a video) by the compression and expansion processing unit 208. The compressed image data is converted into an image file to which necessary ancillary information such as imaging date and time or imaging conditions is added, and then, the image file is stored in the memory card 212 via the media control unit 210.

The body-side CPU 220 collectively controls an entire operation of the imaging device 10. Further, the body-side CPU 220 constitutes a mounting determination unit that determines whether or not the interchangeable lens 100 and the teleconverter 300 have been mounted on the body mount 260.

The operation unit 222 includes the shutter release button 22, the shutter speed dial 23, and the exposure correction dial 24 illustrated in FIG. 1, and the MENU/OK key 27, the cross key 28, and the playback button 29 illustrated in FIG. 2. The body-side CPU 220 controls each unit of the imaging device 10 based on an input from the operation unit 222 or the like.

The clock unit 224 is a timer and measures time on the basis of a command from the body-side CPU 220. Further, the clock unit 224 is a calendar and measures current date and time.

The flash ROM 226 is a readable and writable nonvolatile memory, and stores various types of setting information or lens data, individual identification information of the interchangeable lens 100 and the teleconverter 300, and the like.

Various types of data necessary for a control program or control executed by the body-side CPU 220 is recorded in the ROM 228. The body-side CPU 220 controls each unit of the imaging device 10 according to the control program stored in the ROM 228 using the RAM 207 as a work area.

The AF detection unit 230 calculates a numerical value necessary for autofocus (AF) control on the basis of the digital image signal. In the case of so-called contrast AF, for example, an integration value (focus evaluation value) of a high frequency component of a signal of a G (green) pixel in a predetermined AF area is calculated. The body-side CPU 220 moves the focus lens 106 to a position at which the focus evaluation value is maximized. AF is not limited to the contrast AF. For example, phase difference AF may be performed.

The AE/AWB detection unit 232 calculates a numerical value necessary for automatic exposure (AE) control and automatic white balance (AWB) control on the basis of the digital image signal. The body-side CPU 220 calculates brightness of the subject (subject brightness) on the basis of the numerical value obtained from the AE/AWB detection unit 232, and determines the diaphragm information (F-number) and the shutter speed from a predetermined program diagram.

The power control unit 240 applies a power supply voltage supplied from the battery 242 to each unit of the camera body 200 according to a command of the body-side CPU 220. Further, the power control unit 240 applies the power supply voltage supplied from the battery 242 to each unit of the interchangeable lens 100 and the teleconverter 300 via the body mount 260, the lens mount 160, and the distal end side mount 362 and the proximal end side mount 364 of the teleconverter 300 according to a command of the body-side CPU 220.

A lens power switch 244 performs switching between ON and OFF and switching between levels of the power supply voltage applied to the interchangeable lens 100 and the teleconverter 300 via the body mount 260, the lens mount 160, the distal end side mount 362, and the proximal end side mount 364 according to a command of the body-side CPU 220.

The body-side communication unit 250 performs signal transmission and reception (communication) to and from the lens-side communication unit 150 of the interchangeable lens 100 according to a command of the body-side CPU 220. Meanwhile, the lens-side communication unit 150 performs signal transmission and reception (communication) to and from the body-side communication unit 250 of the camera body 200 and the teleconverter-side communication unit 350 of the teleconverter 300 according to a command of the lens-side CPU 120.

<Configuration of Teleconverter>

The teleconverter 300 includes a teleconversion lens 302, a teleconverter-side CPU (an accessory control unit) 320, a flash ROM 326, a teleconverter-side communication unit 350, the distal end side mount 362, and the proximal end side mount 364. The teleconverter-side microcomputer (MC) 352 includes the teleconverter-side CPU 320, the flash ROM 326, and the teleconverter-side communication unit 350.

The teleconversion lens 302 is a lens (or a lens group) for making a focal length longer than a focal length of the interchangeable lens 100 alone in a state in which the interchangeable lens 100 and the teleconverter 300 are mounted. A rate of change in the focal length may have a value of 1.4 times, 2 times or the like.

The teleconverter-side CPU 320 is a central processing unit (CPU) of the teleconverter 300, and includes a RAM 322 and a ROM 324 built thereinto.

The flash ROM 326 is a nonvolatile memory that stores firmware of the teleconverter 300, data of optical characteristics (for example, a magnification of a focal length or a degree of change in a diaphragm), and the like.

The teleconverter-side CPU 320 controls the teleconverter-side communication unit 350 using the RAM 322 as a work area according to the control program (firmware) stored in the ROM 324 or the flash ROM 326.

In a state in which the interchangeable lens 100 is mounted on the camera body 200 via the teleconverter 300, the teleconverter-side communication unit 350 performs communication with the interchangeable lens 100 via the plurality of signal terminals provided in the lens mount 160 and the distal end side mount 362. Note that in the embodiment, the teleconverter 300 does not directly communicate with the camera body 200, and the interchangeable lens 100 that has received the request command from the camera body 200 performs transmission and reception to and from the teleconverter 300.

<Communication Via Terminals>

FIG. 4 is an illustrative diagram illustrating the body mount 260 and the lens mount 160, peripheral portions thereof, and relevant portions in the teleconverter 300. In a state in which the interchangeable lens 100 is mounted on the camera body 200 via the teleconverter 300, the plurality of terminals 260a (ten terminals denoted by reference numerals "B01" to "B10": a plurality of first terminals in FIG. 4 in this example) of the body mount 260 are brought into contact with the plurality of terminals of the proximal end side mount 364 of the teleconverter 300, respectively, and the plurality of terminals (ten terminals denoted by reference numerals "L01" to "L10": a plurality of second terminals in FIG. 4 in this example) of the lens mount 160 are brought into contact with the plurality of terminals (a plurality of fourth terminals) 362a (FIG. 1) of the distal end side mount 362 of the teleconverter 300, respectively. Note that illustration of a plurality of terminals (a plurality of third terminals) of the proximal end side mount of the teleconverter 300 is omitted.

<Communication Between Camera Body and Interchangeable Lens>

In the above configuration, communication between the camera body 200 and the interchangeable lens 100 will be described below. In the communication between the camera body 200 and the interchangeable lens 100, signals are transmitted and received via the plurality of terminals provided on the distal end side mount 362 and the proximal end side mount 364 of the teleconverter 300, but since the teleconverter-side CPU 320 or the teleconverter-side communication unit 350 is not involved in control of the transmission and reception between the camera body 200 and the interchangeable lens 100, description of the teleconverter 300 and the terminals thereof will be appropriately omitted hereinafter. Note that in the following description, the signal terminals are appropriately referred to as "terminals". For example, an INTR_BUSY signal terminal to be described below may be referred to as a "INTR_BUSY terminal".

A first terminal B01 (a +5 V terminal) of the body mount 260 is a first body-side power supply terminal for giving a +5 V voltage of the battery 242 from the camera body 200 to the interchangeable lens 100, and is connected to the power control unit 240 and the battery 242 via the lens power switch 244.

A second terminal B02 (a +3.3 V terminal) of the body mount 260 is a second body-side power supply terminal for applying a +3.3 V voltage of the battery 242 from the camera body 200 to the interchangeable lens 100.

A third terminal B03 (a ground (GND) terminal) and a fourth terminal B04 (a digital ground (DGND) terminal) of the body mount 260 are body-side ground terminals for giving a 0 V (ground voltage) from the camera body 200 to the interchangeable lens 100. The third terminal B03 and the fourth terminal B04 are connected to a ground of the camera body 200.

A fifth terminal B05 (a LENS_DET (Lens Detection) terminal) of the body mount 260 is a body-side terminal dedicated for detection of the interchangeable lens 100 and the teleconverter 300, as will be described in detail below.

A sixth terminal B06 to a tenth terminal B10 of the body mount 260 are a plurality of body-side signal terminals for signal transmission and reception to and from the interchangeable lens 100.

The sixth terminal B06 (an INTR_BUSY signal terminal) of the body mount 260 is a body-side busy signal terminal (an Inter Busy signal terminal) for notifying whether or not the interchangeable lens 100 or the camera body 200 is in a specific operation period.

The seventh terminal B07 (a VSYNC signal terminal) of the body mount 260 is a body-side signal terminal (a vertical synchronization signal terminal) for vertical synchronization between the camera body 200 and the interchangeable lens 100.

The eighth terminal B08 (an SCK signal terminal), the ninth terminal B09 (an MOSI signal terminal), and the tenth terminal B10 (a MISO signal terminal) of the body mount 260 are body-side communication signal terminals for serial communication between the camera body 200 and the interchangeable lens 100. The system clock (SCK) signal is a clock signal that is applied from the camera body 200 serving as a master to the interchangeable lens 100 serving as a slave. The MOSI (Master Out/Slave In) signal is a signal that is output from the camera body 200 serving as a master and input to the interchangeable lens 100 serving as a slave. The MISO (Master In/Slave Out) signal is output from the interchangeable lens 100 serving as a slave and input to the camera body 200 serving as the master.

The fifth terminal B05 (LENS_DET (Lens Detection) terminal) of the body mount 260 is a body-side terminal dedicated for detection of the interchangeable lens 100 and the teleconverter 300. In this example, a high level (a high potential) indicates that the LENS_DET (Lens Detection) terminal of the body mount 260 and the LENS_DET terminal (the fifth terminal L05) of the lens mount 160 are in a non-contact state (a non-mounted state), and a low level (a low potential) indicates that the LENS_DET terminal of the body mount 260 and the LENS_DET terminal of the lens mount 160 are in a contact state (a mounted state) (via the distal end side mount 362 and the proximal end side mount 364 of the teleconverter 300).

The fifth terminal B05 (a LENS_DET terminal) of the body mount 260 is connected to the power control unit 240 and the battery 242 via a first pull-up resistor R1. Further, the ninth terminal B09 (a MOSI signal terminal) among the plurality of signal terminals (the sixth terminal B06 to the tenth terminal B10) for signal transmission and reception (communication) of the body mount 260 is connected to the battery 242 via a second pull-up resistor R2 and the lens power switch 244.

The second pull-up resistor R2 is connected to the lens power switch 244. In a state in which the lens power switch 244 is turned off (the non-power supply voltage supply state of the interchangeable lens 100), the ninth terminal B09 (the MOSI signal terminal) is not pulled up. The ninth terminal B09 (the MOSI signal terminal) is pulled up in a state in which the lens power switch 244 is turned on by the body-side CPU 220 (a power supply voltage supply state of the interchangeable lens 100). That is, the voltage of the ninth terminal L09 (the MOSI signal terminal) of the interchangeable lens 100 does not become at a high level only by turning on the power switch of the camera body 200, but in a case where the lens power switch 244 is turned on by the body-side CPU 220, the voltage of the ninth terminal L09 (the MOSI signal terminal) of the interchangeable lens 100 becomes at a high level. Accordingly, malfunction of the lens-side MC 152 on the interchangeable lens 100 side is prevented.

Figure 5:
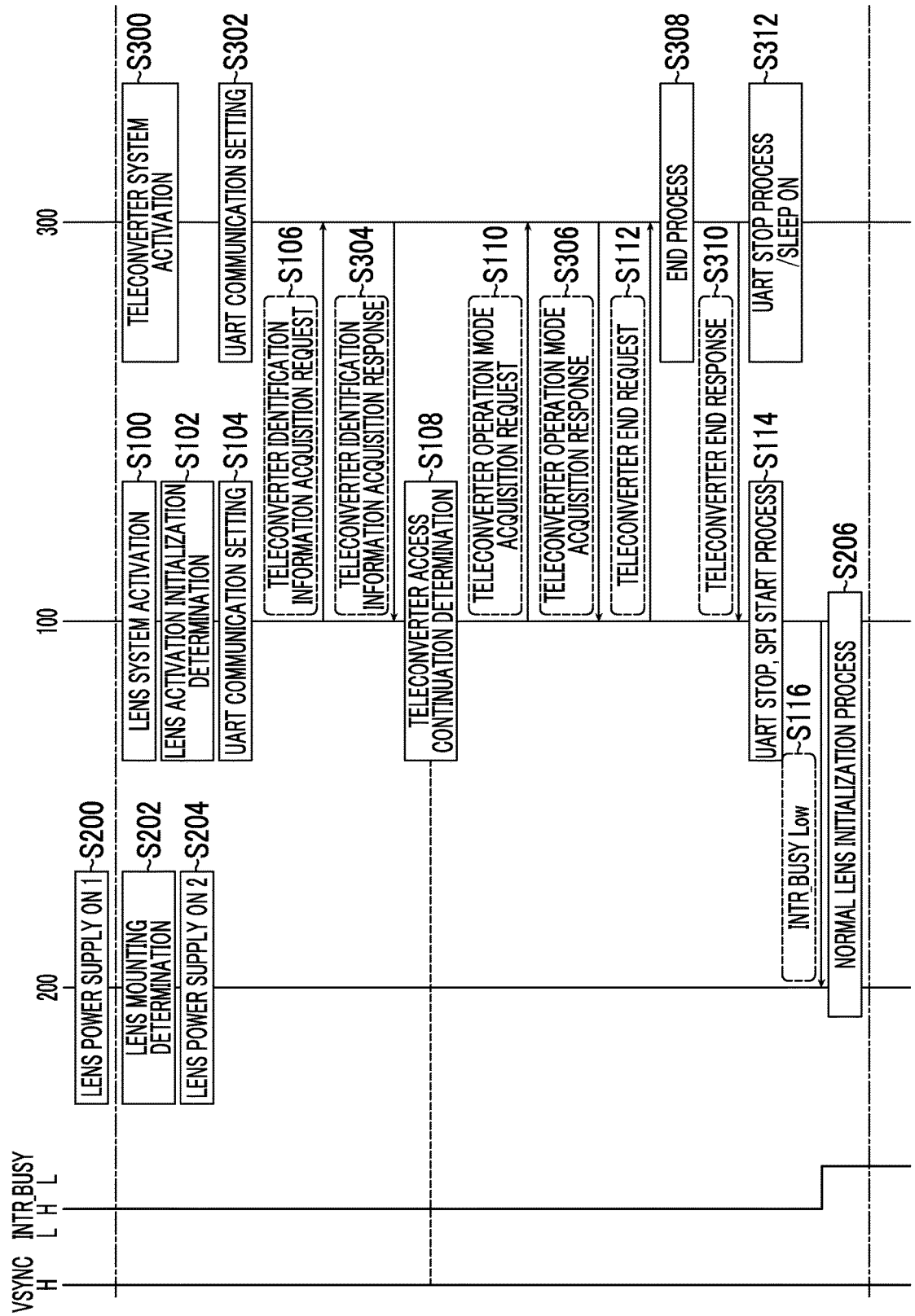
FIG. 5 is a diagram illustrating a normal activation sequence in the camera system according to the embodiment of the present invention.

The body-side CPU 220 of the camera body 200 sets only the fifth terminal B05 (the LENS_DET terminal) to a determination target and determines whether or not the fifth terminal B05 (the LENS_DET terminal) is at a low level before the pre-power supply voltage is supplied to the interchangeable lens 100 and the teleconverter 300 via the body-side power supply terminal of the body mount 260 (step S200 in FIG. 5). In a case where the LENS_DET terminal is at a low level in this determination, the body-side CPU 220 of the camera body 200 determines whether or not both the LENS_DET terminal and the ninth terminal B09 (the MOSI signal terminal) at the time of non-communication are at the low level after the pre-power supply voltage is supplied to the interchangeable lens 100 and the teleconverter 300 via the body-side power supply terminal of the body mount 260 (step S202 in FIG. 5).

The fifth terminal L05 (the LENS_DET terminal) of the lens mount 160 is connected to the ground (the GND terminal and the DGND terminal). Further, the ninth terminal L09 (the MOSI signal terminal) among the plurality of signal terminals (the sixth terminal L06 to the tenth terminal L10) of the lens mount 160 is connected to the ground via a pull-down resistor R3 that has a resistance value sufficiently smaller than the second pull-up resistor R2.

As the mounting determination unit, the body-side CPU 220 determines whether or not the lens mount 160, and the distal end side mount 362 and the proximal end side mount 364 of the teleconverter 300 are mounted on the body mount 260 (that is, a determination as to whether or not the interchangeable lens 100 and the teleconverter 300 are mounted on the camera body 200) on the basis of a voltage (high level/low level) of the fifth terminal B05 (the LENS_DET terminal) of the body mount 260 and a voltage (high level/low level) of a specific body-side signal terminal (the MOSI signal terminal in this example) at the time of non-communication. Specifically, in a case where both the voltage of the fifth terminal B05 (the LENS_DET terminal) of the camera body 200 and the voltage of the ninth terminal B09 (the MOSI signal terminal) at the time of non-communication become at a low level, the body-side CPU 220 determines that the interchangeable lens 100 and the teleconverter 300 are mounted on the body mount 260 (step S202 in FIG. 5).

Further, the lens-side CPU 120 may determine whether or not the lens mount 160 is mounted on the body mount 260 (that is, determine whether or not the interchangeable lens 100 is mounted on the camera body 200) on the basis of the voltage of the fifth terminal L05 (the LENS_DET terminal) of the lens mount 160 and the voltage of the specific lens-side signal terminal (MOSI signal terminal in this example) at the time of non-communication. In this case, specifically, the lens-side CPU 120 determines that the interchangeable lens 100 and the teleconverter 300 are mounted on the body mount 260 in a case where both the voltage of the LENS_DET terminal and the voltage of the MT_MOSI signal terminal at the time of non-communication of the interchangeable lens 100 become at a low level.

In a case where the body-side CPU 220 determines that the interchangeable lens 100 and the teleconverter 300 have been mounted on the body mount 260, the body-side CPU 220 supplies a main power supply voltage to the interchangeable lens 100 (step S204 in FIG. 5).

The body-side MC 252 includes a terminal for detecting a change (high level/low level) in a potential of the sixth terminal B06 (an INTR_BUSY signal terminal) of the body mount 260, a terminal for applying a synchronization signal to the seventh terminal B07 (a VSYNC signal terminal) of the body mount 260, an interface (SPI: Serial Peripheral Interface) for serial communication using the eighth terminal B08 to the tenth terminal B10 (hereinafter also referred to as "communication signal terminals") of the body mount 260, a terminal for detecting a change (high level/low level) in a potential of the fifth terminal B05 (the LENS_DET terminal) of the body mount 260, and a terminal for updating firmware of the interchangeable lens 100.

The lens-side MC 152 includes a terminal for detecting a change (high level/low level) in a potential of the sixth terminal L06 (INTR_BUSY signal terminal) of the lens mount 160, an interface (SPI) for serial communication using the eighth terminal L08 to the tenth terminal L10 (communication signal terminals) of the lens mount 160, and a terminal for updating the firmware of the interchangeable lens 100.

<Communication Between Interchangeable Lens and Teleconverters>

Next, communication between the interchangeable lens 100 and the teleconverter 300 will be described. The communication between the interchangeable lens 100 and the teleconverter 300 is performed using a two-line Universal Asynchronous Receiver Transmitter (UART) scheme in which the interchangeable lens 100 is a master and the teleconverter 300 is a slave.

In a state in which the interchangeable lens 100 is mounted on the camera body 200 via the teleconverter 300, the ten terminals 362a of the distal end side mount 362 of the teleconverter 300 are brought into contact with the first terminal L01 to the tenth terminal L10 of the interchangeable lens 100, respectively, and the ten terminals of the proximal end side mount 364 are brought into contact with the first terminal B01 to the tenth terminal B10 of the camera body 200, respectively. Communication signal lines between the interchangeable lens 100 and the teleconverter 300 are connected to communication signal lines of the interchangeable lens 100 via these terminals.

Specifically, signal lines for a pre-power supply voltage supply signal and a main power supply voltage supply signal, a mounting detection signal (a LENS_DET signal) of the interchangeable lens 100 and the teleconverter 300, a general-purpose bidirectional interrupt signal (INTR_BUSY signal), a 2-line UART reception signal (a MOSI signal), a 2-line UART transmission signal (a MISO signal), and a rewrite mode selection signal (VSYNC) at the time of firmware updating of the teleconverter 300 are respectively connected to the communication signal lines between the interchangeable lens 100 and the camera body 200.

The LENS_DET signal is at a low level (a low potential) in a case where the interchangeable lens 100 and the teleconverter 300 are mounted on the camera body 200, and is at a high level (a high potential) in a case where the interchangeable lens 100 and the teleconverter 300 are not mounted. The MOSI signal is used in a case where the teleconverter 300 receives a signal from the interchangeable lens 100 and the MISO signal is used in a case where the teleconverter 300 transmits a signal to the interchangeable lens 100. The voltage levels of these signals are both +3.3 V.

Note that the teleconverter 300 does not directly communicate with the camera body 200, and the interchangeable lens 100 that has received a request command from the camera body 200 performs transmission and reception to and from the teleconverter 300.

<Normal Activation Sequence>

Next, a normal activation sequence in the imaging device 10 of the embodiment (in a case where a mode is not a mode in which the firmware of the teleconverter 300 is updated) will be described with reference to FIG. 5.

In a case where a power switch (not shown) provided in the operation unit 222 of the camera body 200 is turned on, the body-side CPU 220 determines whether or not the fifth terminal B05 (the LENS_DET terminal) of the body mount 260 is at a low level as described above, and then, supplies the pre-power supply voltage to the interchangeable lens 100 and the teleconverter 300 (step S200). Note that in this case, the body-side CPU 220 sets the VSYNC signal to a high level, and the lens-side CPU 120 sets the INTR_BUSY signal to a high level. Note that the pre-power supply voltage is supplied in a case where the VSYNC signal is at a high level, but since a setting of the terminals of the camera body 200 to be described below is not performed at this point, signals from the interchangeable lens 100 and the teleconverter 300 are not recognized as signals (invalidated).

In a case where the LENS_DET terminal is at a low level in the above determination, the body-side CPU 220 detects the signal levels of the LENS_DET terminal and the MOSI signal terminal at the time of non-communication after the pre-power supply voltage is supplied in step S200, determines that the interchangeable lens 100 and the teleconverter 300 have been mounted on the body mount 260 in a case where both signals become at the low level (step S202), and supplies main power supply voltage (step S204).

In a case where the pre-power supply voltage is supplied in step S200, the lens-side CPU 120 of the interchangeable lens 100 activates the lens system (step S100), determines initialization of the lens activation (step S102), and performs a UART communication setting (step S104). On the other hand, in a case where the pre-power supply voltage is supplied, the teleconverter-side CPU 320 of the teleconverter 300 activates the system of the teleconverter 300 (step S300) and sets the UART communication setting (step S302).

In a case where the processes in steps S104 and S302 end, the lens-side CPU 120 transmits an acquisition request for teleconverter identification information (including a serial number as the individual identification information of the teleconverter 300 and optical characteristic data of the teleconverter 300) to the teleconverter 300 (step S106). The optical characteristic data includes a focal length scaling ratio, but the present invention is not limited thereto and may include data such as a rate of change in a diaphragm value (F-number). In a case where the lens-side CPU 120 receives the teleconverter identification information from the teleconverter 300 before timeout (step S304), the lens-side CPU 120 then generates (acquires) combination identification information (combination serial number) that is information unique to the combination of the interchangeable lens 100 and the teleconverter 300, and lens data related to the combination of the interchangeable lens 100 and the teleconverter 300.

In a case where the lens-side CPU 120 of the interchangeable lens 100 receives the teleconverter identification information in step S304, the lens-side CPU 120 of the interchangeable lens 100 performs a determination (a teleconverter access continuation determination) as to whether or not to continue access to the teleconverter 300 (a communicatable state) according to an output signal level of the VSYNC terminal (step S108). In the teleconverter access continuation determination, in a case where the VSYNC terminal is at the low level, the lens-side CPU 120 of the interchangeable lens 100 determines to continue the teleconverter access. In a case where the VSYNC terminal is at the high level, the lens-side CPU 120 of the interchangeable lens 100 determines to stop the teleconverter access. In the normal activation sequence illustrated in FIG. 5 (in a case where the firmware updating of the teleconverter 300 is not performed), since the VSYNC signal is set to the high level, the lens-side CPU 120 of the interchangeable lens 100 determines not to continue the teleconverter access.

Then, the interchangeable lens 100 transmits a teleconverter operation mode acquisition request to the teleconverter 300 (step S110), and the teleconverter 300 returns a response to the teleconverter operation mode acquisition request (step S306). Here, the teleconverter operation mode includes, for example, a normal operation mode, a firmware update mode (FWUP date mode: also referred to as a teleconverter operation mode), and a standby mode. Commands that can be transmitted are limited for each operation mode. For example, in the normal operation mode, a teleconverter end command is received, whereas in the FWUP date mode, the teleconverter end command is not received. Further, the standby mode is an operation mode in which all commands are not received.

The activation sequence illustrated in FIG. 5 is the normal operation mode in which the firmware update of the teleconverter 300 is not performed, and the lens-side CPU 120 transmits a teleconverter end request (teleconverter end command) to the teleconverter 300 (step S112). In a case where the teleconverter-side CPU 320 receives the teleconverter end request, the teleconverter-side CPU 320 performs a process of ending a teleconverter system to set the teleconverter 300 to the standby mode (step S308), returns a teleconverter end response to the interchangeable lens 100 (step S310), and performs a process of stopping the UART communication to enter sleep state (step S312).

In a case where the lens-side CPU 120 receives the teleconverter end response, the lens-side CPU 120 performs a process of stopping the UART communication and a process of starting SPI communication (step S114), and sets the INTR_BUSY signal to a low level (step S116: lens initialization completion notification interrupt signal). This signal is received, and a normal lens initialization process (a communication terminal setting of the camera body 200 and an initial position drive of the interchangeable lens 100, lens data acquisition request and response according to the combination of the interchangeable lens 100 and the teleconverter 300, or the like) is performed between the camera body 200 and the interchangeable lens 100 (step S206).

Figure 6:
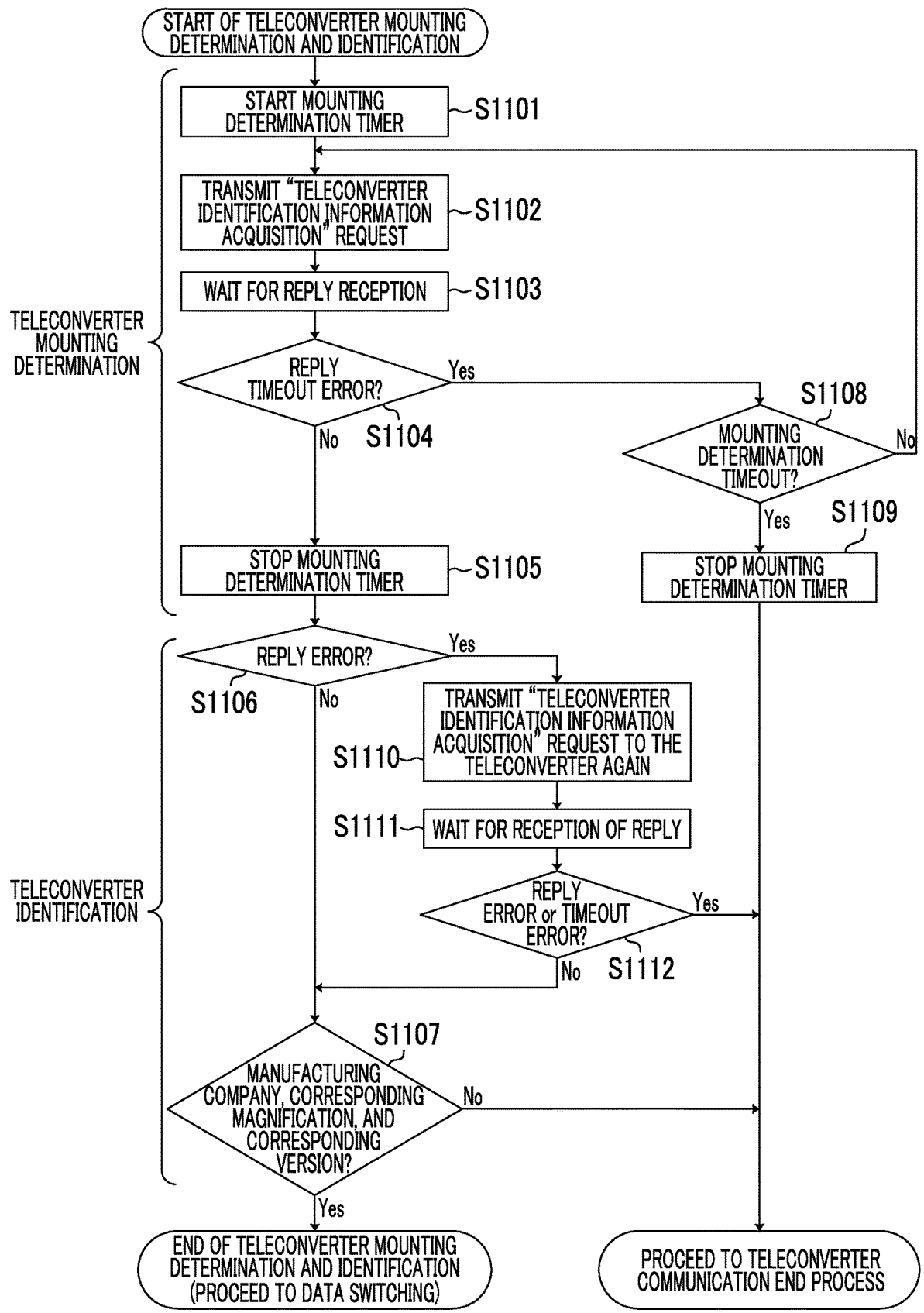
FIG. 6 is a flow diagram illustrating a teleconverter mounting determination and identification of a teleconverter.

FIG. 6 is a flowchart illustrating a mounting determination of the teleconverter 300 performed by the lens-side CPU 120 and identification of the teleconverter 300.

First, the mounting determination of the teleconverter 300 is performed. The lens-side CPU 120 starts a mounting determination timer provided in the lens-side CPU 120 (step S1101). The lens-side CPU 120 transmits a teleconverter identification information acquisition request to the teleconverter 300 (step S1102). Transmission of the teleconverter identification information acquisition request has been described in step S106 in FIG. 5. Thereafter, the lens-side CPU 120 waits for a reply from the teleconverter 300 (step S1103), and the lens-side CPU 120 performs a determination of a reply timeout error on the basis of the mounting determination timer (step S1104). In a case where reception of a reply command from the teleconverter 300 is not started within a predetermined time after the teleconverter identification information acquisition request is transmitted to the teleconverter 300 (Yes in step S1104), the lens-side CPU 120 determines a timeout error. Thereafter, the lens-side CPU 120 performs a determination of mounting determination timeout (step S1108). Note that, here, the reply time is a time for which the lens-side CPU 120 is waiting for a reply after transmitting a teleconverter identification information acquisition request, and the mounting determination time is a time required for a mounting determination. According to the setting of the mounting determination time, the lens-side CPU 120 can repeat the teleconverter identification information acquisition request and the waiting a plurality of times.

Therefore, in a case where the lens-side CPU 120 determines the mounting determination time on the basis of the mounting determination timer to determine the mounting determination timeout (Yes in step S1108), the lens-side CPU 120 stops the mounting determination timer (step S1109) and proceeds to a process of ending communication of the teleconverter 300.

Further, in a case where the lens-side CPU 120 receives a response command (a teleconverter identification information acquisition response) from the teleconverter 300 within a predetermined time after transmitting the teleconverter identification information acquisition request to the teleconverter 300 (No in step S1104), the lens-side CPU 120 determines non-timeout error (No in step S1104), and stops the mounting determination timer (step S1105).

As described above, the lens-side CPU 120 determines whether or not the teleconverter 300 is mounted according to whether or not a response to the teleconverter identification information acquisition request can be received from the teleconverter 300 during the reply time.

Next, identification (specifying) of the teleconverter 300 is performed. In a case where the lens-side CPU 120 determines that the teleconverter 300 is mounted after sending the teleconverter identification information acquisition request to the teleconverter 300, that is, in a case where the reply is received from the teleconverter 300 within a predetermined time (No in step S1104), the mounting timer is stopped (step S1105), and the identification of the teleconverter 300 is performed.

The lens-side CPU 120 determines whether or not the acquired reply is an error reply (step S1106). In a case where the reply is an error reply (Yes in step S1106), the lens-side CPU 120 transmits the teleconverter identification information acquisition request to the teleconverter 300 again (step S1110), and waits for reception of the reply from the teleconverter 300 (step S1111). Thereafter, the lens-side CPU 120 performs the timeout error determination (steps S1104 and S1108) and the reply error determination (step S1106) described above (step S1112), and in a case where an error is determined (Yes in step S1112), the process proceeds to a process of ending teleconverter communication. Note that, here, the reply error is an error reply transmitted from the teleconverter 300, and in a case where there is an error in the command received from the interchangeable lens 100 or in a case where an error has occurred when a process according to the command is performed, the teleconverter 300 transmits the error reply.

On the other hand, in a case where the acquired reply is not an error reply (No in step S1106), the lens-side CPU 120 collates the acquired reply (the teleconverter identification information) with the stored lens data for a teleconverter in terms of a manufacturing company, a corresponding magnification, and a corresponding version. In a case where the data match in all items (Yes in step S1107), the teleconverter mounting determination and the identification (specifying) are completed, and the process proceeds to switching of the lens data to be transferred to the camera body 200. That is, when there is a request for lens data from the camera body 200, the lens-side CPU 120 transfers the lens data (first lens data) for the teleconverter optimized according to optical characteristics of the teleconverter 300 of the interchangeable lens 100 to the camera body according to the identification information of the teleconverter 300 acquired as described above.

Meanwhile, the lens-side CPU 120 collates the acquired reply (the teleconverter identification information) with the stored lens data for a teleconverter in terms of the manufacturing company, the corresponding magnification, and the corresponding version, and proceeds to the process of ending communication of the teleconverter 300 in a case where there is any one item that does not match (No in step S1107). In a case where the identification information has not been acquired or in a case where the lens data for a teleconverter corresponding to the identification information is not included, the lens-side CPU 120 transfers the original lens data (second lens data) of the interchangeable lens 100 to the camera body 200.

Figure 7:
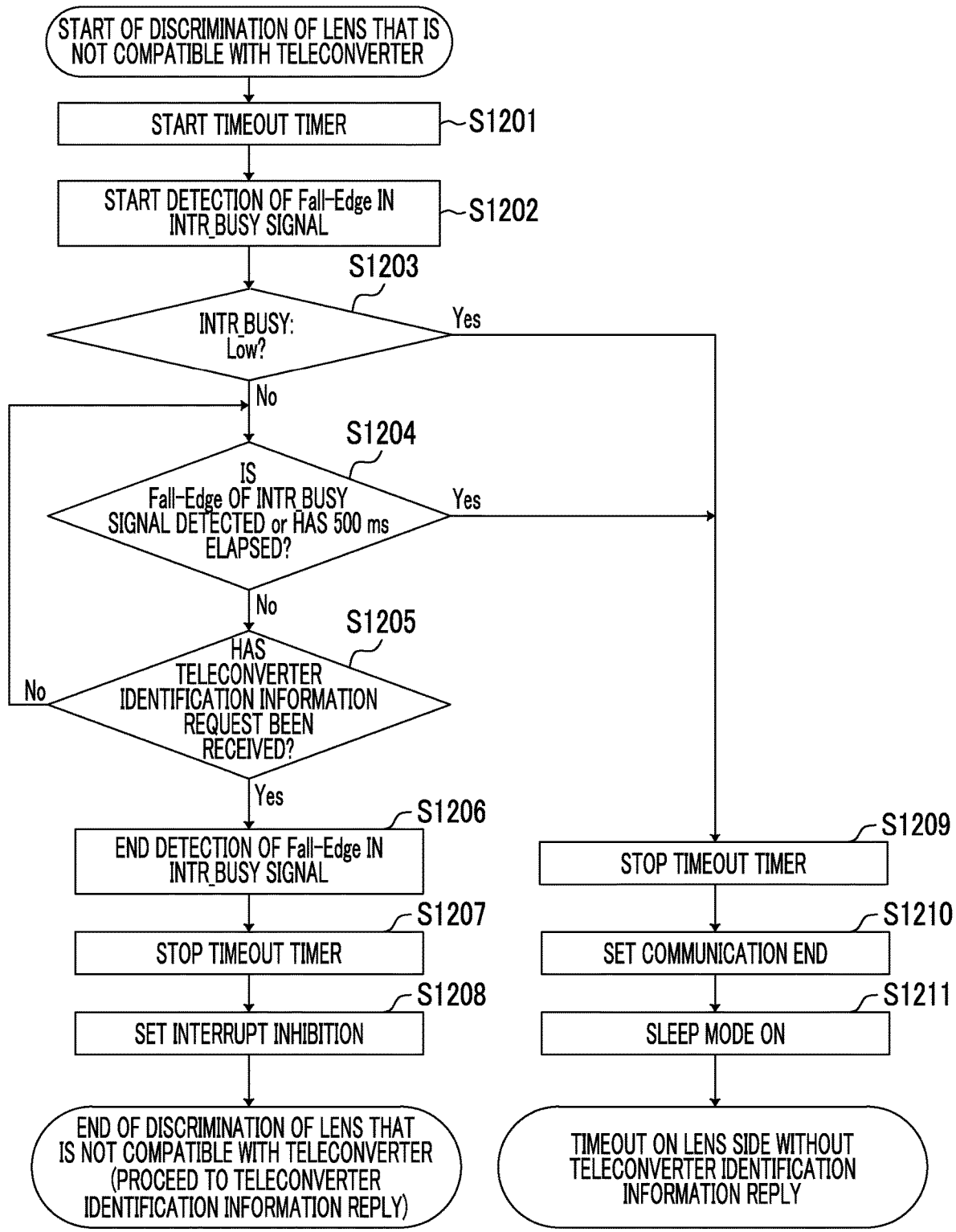
FIG. 7 is a flowchart for determining an interchangeable lens that is incompatible with a teleconverter.

FIG. 7 is a flowchart for determining the interchangeable lens 100 that is not compatible with the teleconverter, which his performed by the teleconverter 300. In a case where the interchangeable lens 100 is not compatible with the teleconverter 300, the interchangeable lens 100 does not perform the transmission of the teleconverter identification information request as described above on the teleconverter 300. Accordingly, when the teleconverter-side CPU 320 of the teleconverter 300 does not receive the accessory identification information acquisition request from the interchangeable lens 100 within a predetermined period after start of power supply from the camera body 200, the teleconverter-side CPU 320 of the teleconverter 300 performs a communication end setting to disable data communication with the interchangeable lens 100. Specifically, the teleconverter 300 determines whether or not the interchangeable lens 100 corresponds to the teleconverter 300 or whether firmware corresponds to the teleconverter 300, and stops waiting for the teleconverter identification information request from the interchangeable lens 100 and enters a standby mode in a case where the corresponding interchangeable lens or firmware corresponds to the teleconverter 300. Hereinafter, description will be made with reference to FIG. 7.

First, the teleconverter-side CPU 320 starts a timeout timer (step S1201). Thereafter, the teleconverter-side CPU 320 starts detection of Fall-Edge in the INTR_BUSY signal (step S1202), and determines whether the INTR_BUSY signal is at a low level (step S1203). In a case where the teleconverter-side CPU 320 detects that the INTR_BUSY signal is at a low level (Yes in step S1203), the teleconverter-side CPU 320 stops the timeout timer (step S1209). Thereafter, the teleconverter-side CPU 320 performs the communication end setting of the teleconverter 300 (step S1210) and turns ON a sleep mode (step S1211). Thereafter, since the interchangeable lens 100 cannot receive the identification information reply from the teleconverter 300, the interchangeable lens 100 performs the timeout process as described above.

On the other hand, in a case where the teleconverter-side CPU 320 determines that the INTR_BUSY signal is not at a low level (No in step S1203), the teleconverter-side CPU 320 determines whether the Fall-Edge of the INTR_BUSY signal is detected or 500 ms (milli-seconds) has elapsed (step S1204). In a case where the Fall-Edge of the INTR_BUSY signal is detected or 500 ms (milli-seconds) has elapsed (Yes in step S1204), the teleconverter-side CPU 320 stops the timeout timer (step S1209).

On the other hand, in a case where the Fall-Edge of the INTR_BUSY signal is not detected and 500 ms (milli-seconds) has not elapsed (No in step S1204), the teleconverter-side CPU 320 determines whether or not the reception of the teleconverter identification information request is performed (step S1205).

In a case where the teleconverter identification information request has not been received (No in step S1205), the teleconverter-side CPU 320 determines whether the Fall-Edge of the INTR_BUSY signal has been detected or 500 ms (milli-seconds) has elapsed again (step S1204).

On the other hand, in a case where the teleconverter-side CPU 320 determines that the teleconverter identification information request is received (Yes in step S1205), the teleconverter-side CPU 320 ends the detection of the fall-edge of the INTR_BUSY signal (step S1206). Thereafter, the teleconverter-side CPU 320 stops the timeout timer (step S1207), and performs an interrupt inhibition setting (step S1208). The teleconverter-side CPU 320 completes the discrimination of a lens incompatible with the teleconverter and proceeds to a teleconverter identification information reply.

Next, a method of updating the firmware of the teleconverter 300 will be described.

Figure 8:
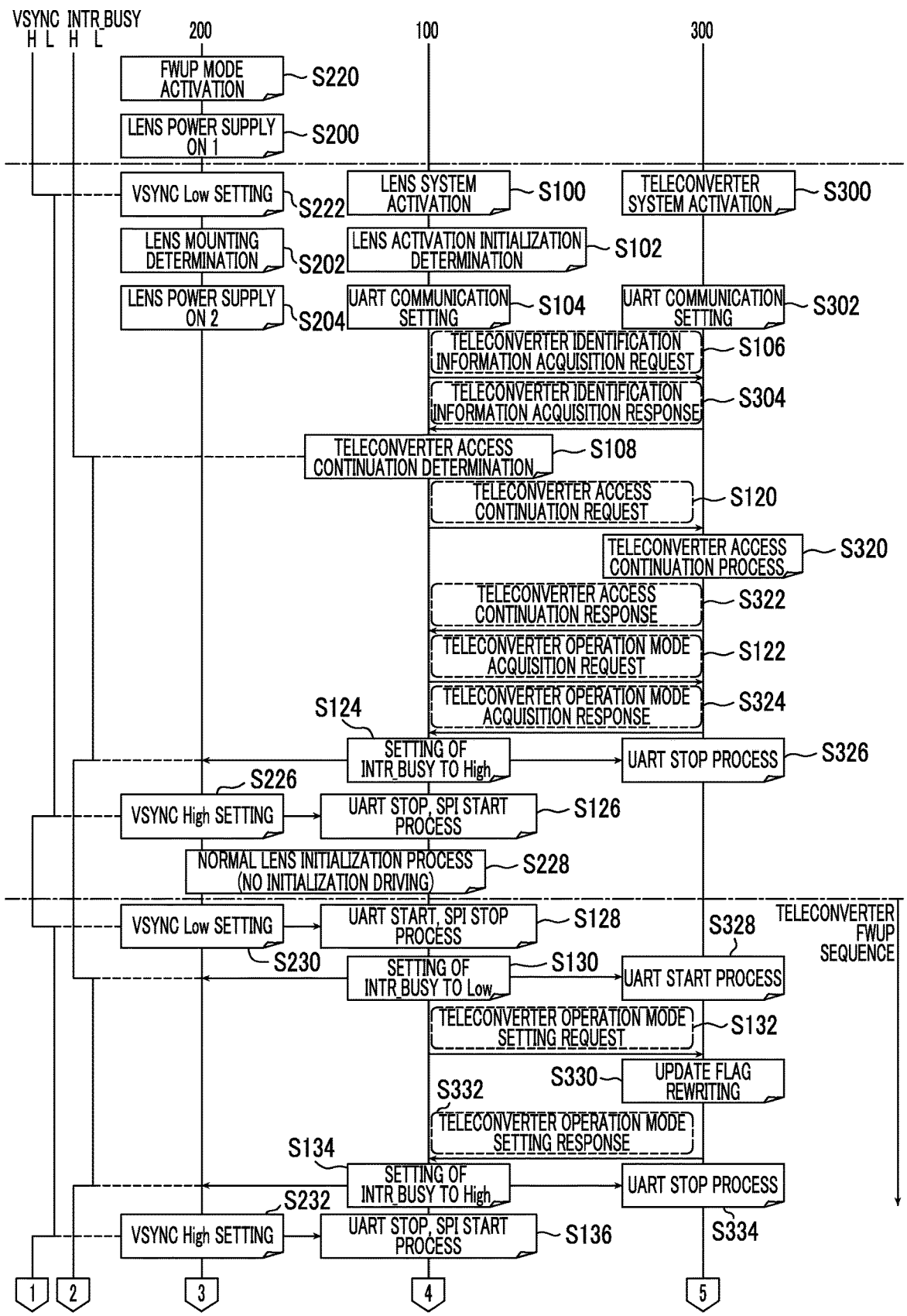
FIG. 8 is a sequence diagram illustrating a first sequence among sequences showing a method of updating firmware of a teleconversion lens.
Figure 9:
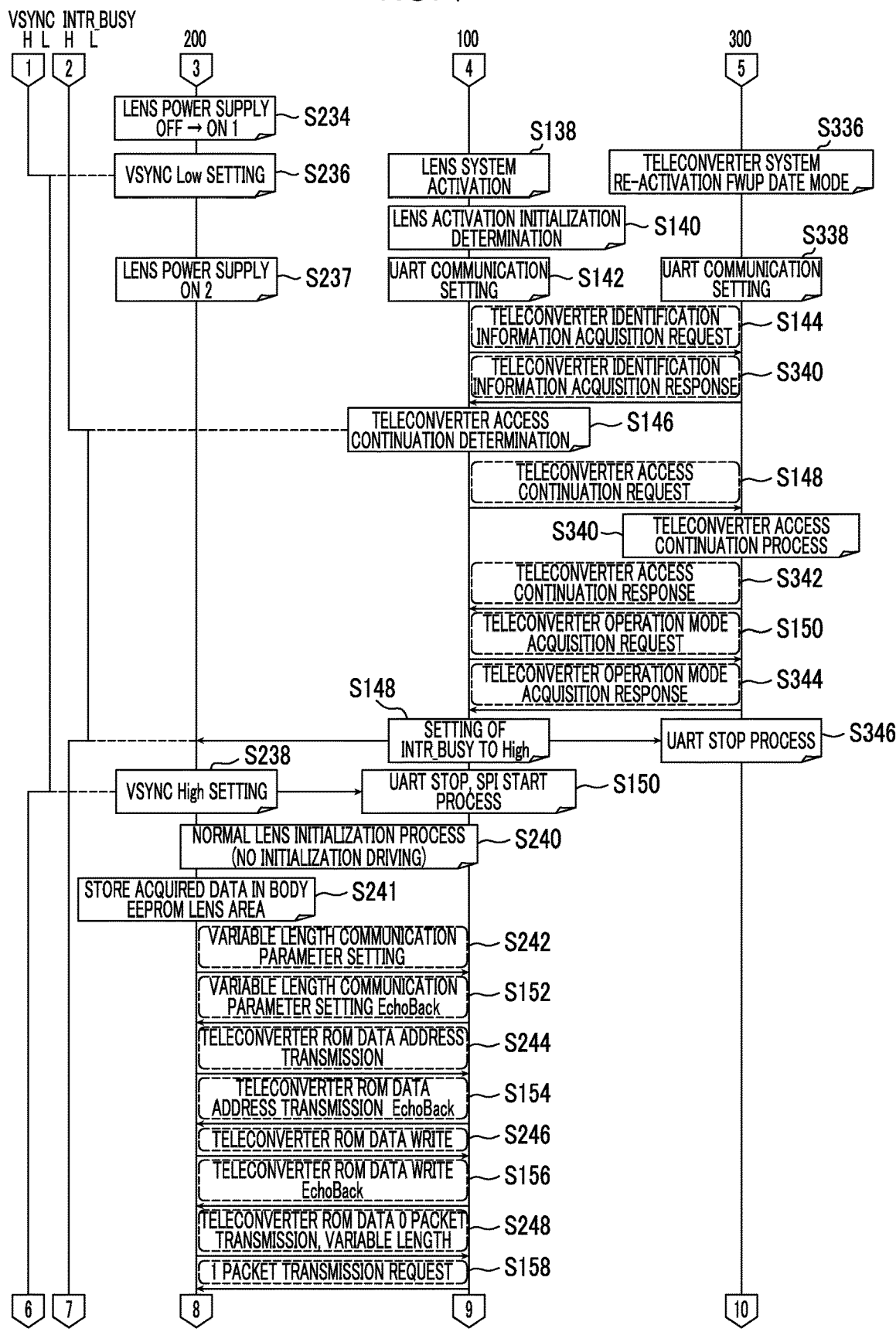
FIG. 9 is a sequence diagram illustrating a second sequence showing a continuation of the first sequence illustrated in FIG. 8.
Figure 10:
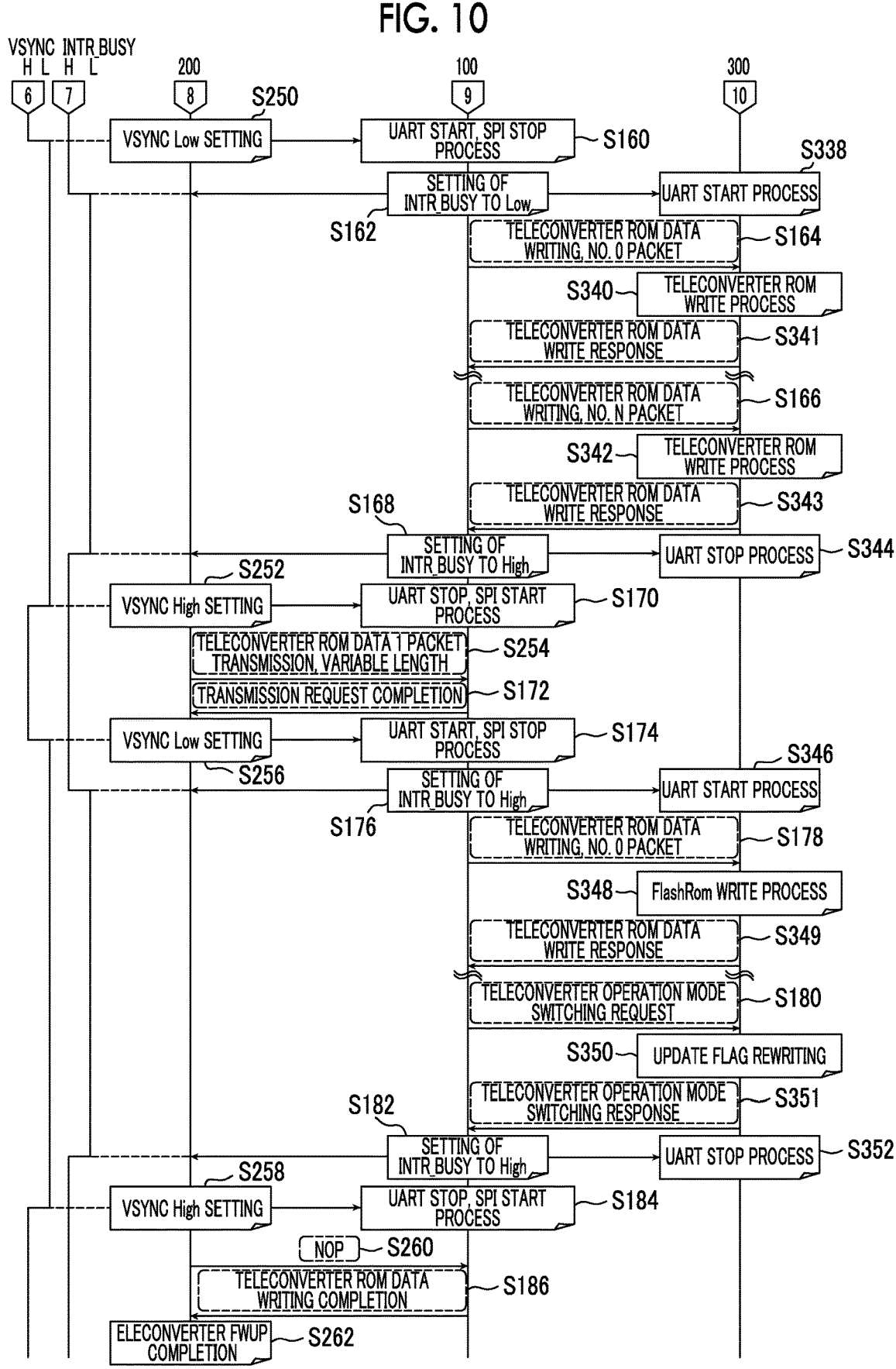
FIG. 10 is a sequence diagram illustrating a third sequence showing a continuation of the second sequence illustrated in FIG. 9.

FIGS. 8 to 10 are sequence diagrams illustrating a method of updating the firmware of the teleconverter 300. Note that the same portions as those of the normal activation sequence of the system illustrated in FIG. 5 are denoted by the same step numbers, and detailed description thereof will be omitted.

As illustrated in FIG. 8, when the firmware of the teleconverter 300 is updated, the camera body 200 is activated in the FWUP date mode, which is a mode in which the firmware is updated (step S220).

In a case where the firmware of the teleconverter 300 is updated, a user downloads firmware for updating of the teleconverter 300 from a server that supports the camera system, and stores the firmware in the memory card 212 of the camera body 200. Further, it is necessary to mount the interchangeable lens 100 on the camera body 200 via the teleconverter 300 of which the firmware is updated.

In a case where the camera body 200 is activated in the FWUP date mode, the same processes as the steps S200, S202, and S204 illustrated in FIG. 5 are performed. Further, after a power supply voltage is supplied, the camera body 200 sets output signal levels of the synchronization signal terminal (a VSYNC terminal) and the busy signal (INTR_BUSY) terminal to a high level (a first polarity), and sets the VSYNC signal to a low level (a second polarity) between step S200 and step S202 at the time of the activation in the FWUP date mode (step S222).

Here, the VSYNC terminal is a terminal for transferring a vertical synchronization signal of the imaging signal from the camera body 200 to the interchangeable lens 100 at the time of imaging, and the interchangeable lens 100 is synchronized with the vertical synchronization signal input via the VSYNC terminal and transmits information such as a focus position from the interchangeable lens side to the camera body. The INTR_BUSY terminal is a terminal for the INTR_BUSY signal for transferring a notification of an operation state from one of the interchangeable lens 100 and the camera body 200 to the other.

In a case where the camera body 200 is activated in the FWUP date mode of this example, the output signal levels of the VSYNC terminal and the INTR_BUSY terminal are controlled corresponding to communication switching between data communication between the camera body 200 and the interchangeable lens 100 and data communication between the interchangeable lens 100 and the teleconverter 300 in a period until the update of the firmware is completed. That is, the lens-side CPU 120 functioning as a communication switching unit controls the output signal level of the INTR_BUSY terminal to perform communication switching between data communication (SPI communication) between the camera body 200 and the interchangeable lens 100 and data communication (UART communication) between the interchangeable lens 100 and the teleconverter 300. Further, the body-side CPU 220 also controls the output signal level of the VSYNC terminal at the time of communication switching. Details of the control (polarity switching) of the output signal levels of the VSYNC terminal and the INTR_BUSY terminal will be described below.

When the interchangeable lens 100 (the lens-side CPU 120 functioning as a communication switching unit) acquires the teleconverter identification information from the teleconverter 300 (step S304), the interchangeable lens 100 determines whether or not the teleconverter access is continued according to the output signal level of the VSYNC terminal (teleconverter access continuation determination) (step S108). In a case where the VSYNC terminal is at a low level, the teleconverter access is determined to be continued, and in a case where the VSYNC terminal is at a high level, the teleconverter access is determined to be stopped. In the case of this example, since the VSYNC signal is set to the low level in step S222, the teleconverter access is determined to be continued. Further, the interchangeable lens 100 switches the INTR_BUSY signal from the high level (the first polarity) to the low level (the second polarity) according to the determination that the teleconverter access is continued.

In a case where the VSYNC terminal is at the low level (the second polarity), the interchangeable lens 100 (the lens-side CPU 120 functioning as the communication switching unit) switches the INTR_BUSY signal from the high level (the first polarity) to the low level (the second polarity) to thereby enable data communication between the interchangeable lens 100 and the teleconverter 300, and the lens-side CPU 120 (the lens control unit) transmits a teleconverter access continuation request to the teleconverter 300 (step S120).

When the teleconverter 300 receives the teleconverter access continuation request, the teleconverter 300 performs a teleconverter access continuation process (step S320). In the teleconverter access continuation process, automatic end due to the INTR_BUSY signal being at a low level is disabled, the timer that counts no communication time after the automatic communication end is disabled, and INTR_BUSY interrupt registration (registration in which falling of the INTR_BUSY signal is set as UART stop, and a rising edge is set as UART start), or the like is performed.

Thereafter, the teleconverter 300 replies to the interchangeable lens 100 with a teleconverter access continuation response (step S322). Then, the interchangeable lens 100 transmits a teleconverter operation mode acquisition request to the teleconverter 300 (step S122), and the teleconverter 300 returns a reply to the teleconverter operation mode acquisition request (step S324).

When the interchangeable lens 100 (the lens-side CPU 120 functioning as a communication switching unit) receives a response to the teleconverter operation mode acquisition, the interchangeable lens 100 switches the INTR_BUSY signal from the low level to the high level (step S124), and the teleconverter-side CPU 320 functioning as an accessory control unit performs a process of stopping the UART communication using rising of the INTR_BUSY signal to the high level as a trigger (step S326).

The camera body 200 (the body-side CPU 220 functioning as a camera control unit) sets the output signal level of the VSYNC terminal from the low level to the high level using rising of the INTR_BUSY signal to the high level in step S124 as a trigger (step S226). Further, when the output signal level of the VSYNC terminal rises to the high level, the interchangeable lens 100 (the lens-side CPU 120 functioning as a communication switching unit) performs the process of stopping the UART communication using rising of the VSYNC signal to the high level as a trigger, and performs the process of starting the SPI communication (step S126). Accordingly, SPI communication can be performed between the camera body 200 and the interchangeable lens 100.

In a case where the SPI communication can be performed between the camera body 200 and the interchangeable lens 100, the normal lens initialization process is performed as in step S206 of FIG. 5 (step S228).

Subsequently, a substantial sequence of updating the firmware of the teleconverter 300 starts.

That is, the camera body 200 sets the VSYNC signal to the low level after the normal lens initialization process ends (step S230). The interchangeable lens 100 (the lens-side CPU 120 functioning as the communication switching unit) performs the process of starting the UART communication and the process of stopping the SPI communication using falling of the VSYNC signal to the low level as a trigger (step S128) and switches the INTR_BUSY signal from the high level to the low level after processing in step S128 (step S130). Further, the teleconverter 300 (the teleconverter-side CPU 320 functioning as the accessory control unit) performs the process of starting the UART communication suing falling of the INTR_BUSY signal to the low level as a trigger (step S328). Accordingly, the UART communication can be performed between the interchangeable lens 100 and the teleconverter 300.

In a case where the UART communication can be performed between the interchangeable lens 100 and the teleconverter 300, the interchangeable lens 100 sends a setting request for the teleconverter operation mode (FWUP date mode) to the teleconverter 300 (step S132), and the teleconverter 300 performs rewriting of the update flag according to the FWUP date mode setting request (step S330). Here, the update flag is a flag indicating whether an operation mode of the teleconverter 300 is the normal operation mode or the FWUP date mode. In step S330, the update flag is rewritten to the flag indicating the FWUP date mode.

After rewriting the update flag, the teleconverter 300 returns a reply to the teleconverter operation mode setting request to the interchangeable lens 100 (step S332).

When the interchangeable lens 100 receives the response to the teleconverter operation mode setting, the interchangeable lens 100 switches the INTR_BUSY signal from the low level to the high level (step S134), and the teleconverter 300 performs the process of stopping the UART communication using rising of the INTR_BUSY signal to the high level as a trigger (step S334).

The camera body 200 sets the output signal level of the VSYNC terminal from the low level to the high level using rising of the INTR_BUSY signal to the high level in step S134 as a trigger (step S232). Further, the interchangeable lens 100 performs the process of stopping the UART communication and the process of starting the SPI communication using rising of the VSYNC signal to the high level as a trigger (step S136).

Subsequently, as illustrated in FIG. 9, the camera body 200 temporarily turns OFF the lens power supply that supplies a voltage to the interchangeable lens 100 (or/and the teleconverter 300) and then turns ON1 the lens power supply again to activate the interchangeable lens 100 (or/and the teleconverter 300) again (step S234). Further, the camera body 200 sets the VSYNC signal to the low level (step S236) and then turns ON2 the lens power supply (step S237).

Meanwhile, when the lens power supply is turned ON, the interchangeable lens 100 performs a process at the time of activating the lens system (steps S138 to S148). Since the processes in steps S138 to S148 are same as the processes in steps S100 to S124 illustrated in FIG. 8, detailed description thereof will be omitted.

Similarly, when the lens power supply (teleconverter power supply) is turned ON, the teleconverter 300 performs a teleconverter activation process (steps S336 to S344). In this case, since the update flag is a flag indicating the FWUP date mode, the update is activated in the FWUP date mode again in step S336. Since the subsequent processes of steps S338 to S346 are the same as the processes of step S302 to S326 illustrated in FIG. 8, detailed description thereof will be omitted.

The camera body 200 sets the output signal level of the VSYNC terminal from the low level to the high level using rising of the INTR_BUSY signal to the high level in step S148 as a trigger, (step S238). Further, the interchangeable lens 100 performs the process of stopping the UART communication and the process of starting the SPI communication using rising of the VSYNC signal to the high level as a trigger (step S150). Accordingly, the SPI communication can be performed between the camera body 200 and the interchangeable lens 100.

In a case where the SPI communication can be performed between the camera body 200 and the interchangeable lens 100, a normal lens initialization process is performed as in step S206 of FIG. 5 (step S240).

Thereafter, the camera body 200 stores firmware for updating of the teleconverter 300 stored in the memory card 212 in a lens area in the flash ROM 226 (step S241). Subsequently, the camera body 200 transfers the firmware in the flash ROM 226 (hereinafter also referred to as "teleconverter ROM data") to the interchangeable lens 100 through the SPI communication between the camera body 200 and the interchangeable lens 100, and the interchangeable lens 100 writes the teleconverter ROM data transferred from the camera body 200 to the flash ROM 126.

That is, the camera body 200 transmits a command for a variable length communication parameter setting to the interchangeable lens 100 (step S242), and the interchangeable lens 100 that has received the command for a variable length communication parameter setting sends back a command for a variable length communication parameter setting (echo back) (step S152). Subsequently, the camera body 200 transmits a teleconverter ROM data address to the interchangeable lens 100 (step S244), and the interchangeable lens 100 that has received the teleconverter ROM data address sends back the teleconverter ROM data address (echo back) (step S154). Then, the camera body 200 transmits a teleconverter ROM data write command to the interchangeable lens 100 (step S246), and the interchangeable lens 100 that has received the teleconverter ROM data write command sends back the teleconverter ROM data write command (echo back) (step S156). The teleconverter ROM data write command is a command for writing to the flash ROM 326.

Then, the camera body 200 divides the teleconverter ROM data into a 0 packet with a variable length and a 1 packet with a variable length and transmits the packets, but first transmits the 0 packet to the interchangeable lens 100 (step S248). The interchangeable lens 100 that has received the 0 packet returns a 1-packet transmission request (step S158).

Subsequently, as illustrated in FIG. 10, the camera body 200 sets the VSYNC signal to the low level (step S250). The interchangeable lens 100 performs the process of starting the UART communication and the process of stopping the SPI communication using falling of the VSYNC signal to the low level as a trigger (step S160), and then, switches the INTR_BUSY signal from the high level to the low level (step S162). Further, the teleconverter 300 (the teleconverter-side CPU 320 functioning as the accessory control unit) performs the process of starting the UART communication using falling of the INTR_BUSY signal to the low level as a trigger (step S338). Accordingly, UART communication can be performed between the interchangeable lens 100 and the teleconverter 300.

Subsequently, the interchangeable lens 100 divides the 0 packet received from the camera body 200 into No. 0 packet to No. N packet, and transmits the divided No. 0 packet (teleconverter ROM data) to the teleconverter 300 (step S164). The teleconverter 300 that has received the No. 0 packet transmits the teleconverter ROM data of the No. 0 packet to the flash ROM 126 in the teleconverter (step S340), and returns the flash ROM data write response to the interchangeable lens 100 (step S341). This writing process is repeatedly executed up to a No. N packet writing process in steps S166, S342, and S343.

When the interchangeable lens 100 receives the No. N packet write response, the interchangeable lens 100 switches the INTR_BUSY signal switched from the low level to the high level (step S168), and the teleconverter-side CPU 320 performs a process of stopping the UART communication using rising of the INTR_BUSY signal to the high level as a trigger (step S344).

The camera body 200 sets the output signal level of the VSYNC terminal to the high level using rising of the INTR_BUSY signal to the high level in step S168 as a trigger (step S252). Further, the interchangeable lens 100 performs a process of stopping the UART communication and performs a process of starting the SPI communication using rising of the VSYNC signal to the high level as a trigger (step S170). Accordingly, SPI communication can be performed between the camera body 200 and the interchangeable lens 100.

In a case where the SPI communication can be performed, the camera body 200 transmits one packet of the teleconverter ROM data to the interchangeable lens 100 (step S254), and the interchangeable lens 100 that has received the one packet returns a transmission request completion (step S172).

When the camera body 200 receives the transmission request completion, the camera body 200 sets the VSYNC signal to the low level (step S256). The interchangeable lens 100 performs the process of starting the UART communication and the process of stopping the SPI communication using falling of the VSYNC signal to the low level as a trigger (step S174), and then, switches the INTR_BUSY signal from the high level to the low level (step S176). Further, the teleconverter 300 performs the process of starting the UART communication using falling of the INTR_BUSY signal to the low level as a trigger (step S346). Accordingly, the UART communication can be performed between the interchangeable lens 100 and the teleconverter 300.

In a case where the UART communication can be performed between the interchangeable lens 100 and the teleconverter 300, the interchangeable lens 100 divides one packet received from the camera body 200 into No. 0 packet to No. N packet, and transmits the No. 0 packet (teleconverter ROM data) to the teleconverter 300 (step S178). The teleconverter 300 that has received the No. 0 packet writes the flash ROM data of the NO. 0 packet to the flash ROM 126 in the teleconverter (step S348), and replies the interchangeable lens 100 with a flash ROM data write response (step S349).

In a case where this writing process is repeatedly executed up to No. N packet, the interchangeable lens 100 transmits a teleconverter operation mode switching request to the teleconverter 300 (step S180), and the teleconverter 300 rewrites the update flag according to the teleconverter operation mode switching request (step S350). Here, since the current update flag is a flag indicating the FWUP date mode, the update flag is rewritten to a flag indicating the normal operation mode in step S350.

After rewrite of the update flag, the teleconverter 300 returns a response to the teleconverter operation mode switching request to the interchangeable lens 100 (step S351).

When the interchangeable lens 100 receives the response to the teleconverter operation mode switching request, the interchangeable lens 100 switches the INTR_BUSY signal from the low level to the high level (step S182), and the teleconverter-side CPU 320 performs the process of stopping UART communication using rising of the INTR_BUSY signal to the high level as a trigger (step S352).

The camera body 200 sets the output signal level of the VSYNC terminal to the high level using rising of the INTR_BUSY signal to the high level in step S182 as a trigger (step S258). Further, the interchangeable lens 100 performs a process of stopping the UART communication using rising of the VSYNC signal to the high level as a trigger, and performs a process of starting the SPI communication (step S184). Accordingly, SPI communication can be performed between the camera body 200 and the interchangeable lens 100.

In a case where the SPI communication can be performed, the camera body 200 transmits a command NOP indicating "no operation" to the interchangeable lens 100 (step S260), and the interchangeable lens 100 that has received the command NOP returns teleconverter ROM data write completion (step S186).

When the camera body 200 receives the teleconverter ROM data write completion, the camera body 200 completes the process of updating the firmware of the teleconverter 300 that is performed from the camera body 200 via the interchangeable lens 100 (step S262).

Figure 11:
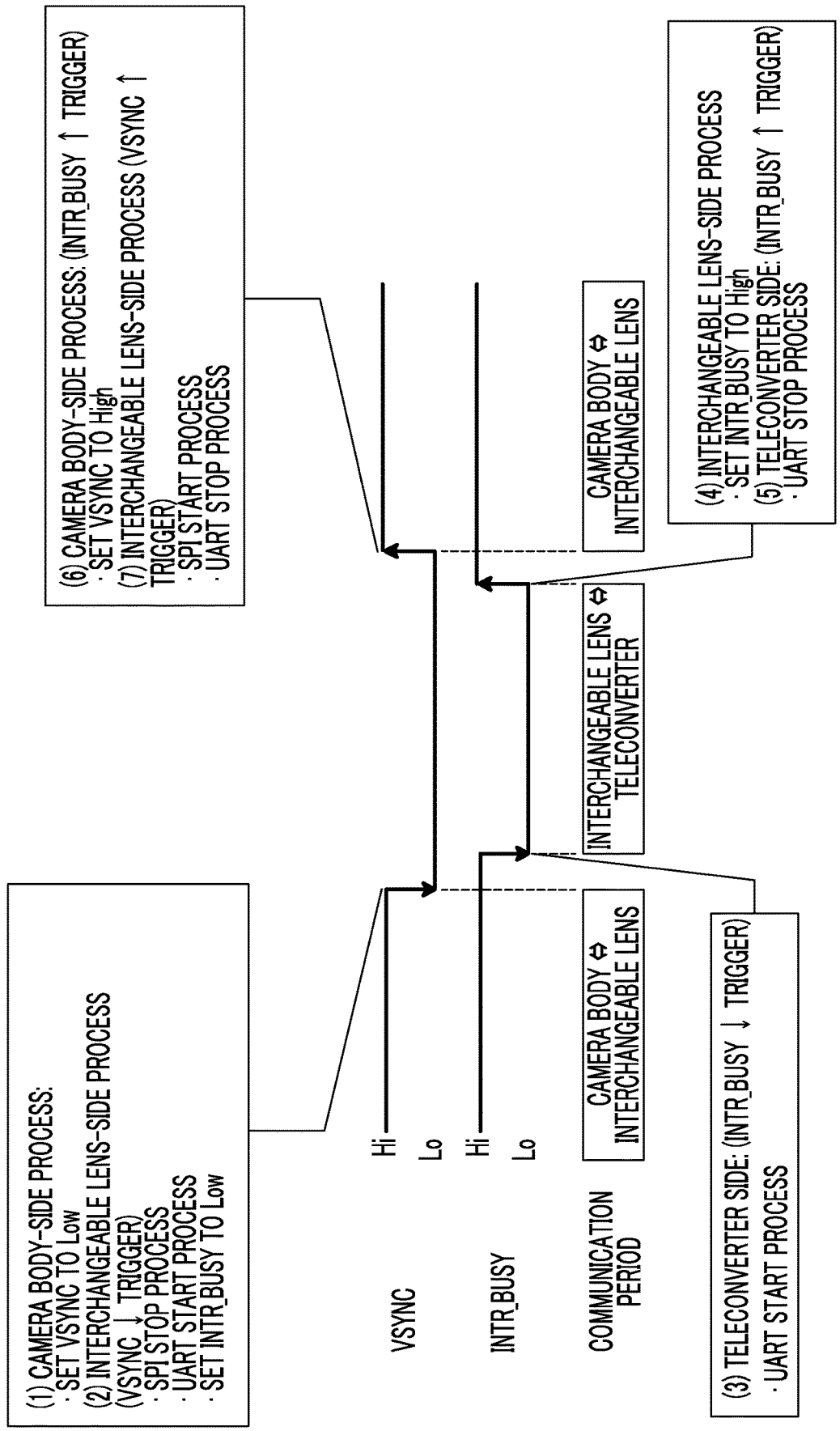
FIG. 11 is a timing chart showing a polarity of each signal of a VSYNC terminal and an INTR_BUSY terminal corresponding to communication switching between data communication between a camera body and an interchangeable lens and data communication between the interchangeable lens and the teleconversion lens.

FIG. 11 is a timing chart illustrating communication switching that is performed in a sequence of updating the firmware of the teleconverter 300 described with reference to FIGS. 8 to 10.

As illustrated in FIG. 11, communication switching between data communication (SPI communication) between the camera body 200 and the interchangeable lens 100 and data communication (UART communication) between the interchangeable lens 100 and the teleconverter 300 is exclusively performed using specific terminals (the INTR_BUSY terminal and the VSYNC terminal in the embodiment) other than the power supply terminal, the ground terminal, and the input and output terminal (the MISO terminal and the MOSI terminal) among the plurality of terminals provided in the body mount 260, the lens mount 160, the distal end side mount 362 of the teleconverter 300, and the proximal end side mount 364 thereof.

That is, communication switching is performed so that the SPI communication can be performed between the camera body 200 and the interchangeable lens 100 in a period in which the output signal level of the VSYNC terminal is a high level and the output signal level of the INTR_BUSY terminal is a high level, and communication switching is performed so that the UART communication can be performed between the interchangeable lens 100 and the teleconverter 300 in a period in which the output signal level of the VSYNC terminal is a low level and the output signal level of the INTR_BUSY terminal is a low level.

Here, in a case where the VSYNC signal is switched from the high level to the low level by the camera body 200 in the period in which the output signal level of the VSYNC terminal is a high level and the output signal level of the INTR_BUSY terminal is a high level (a period in which the SPI communication can be performed between the camera body 200 and the interchangeable lens 100), the interchangeable lens switches the INTR_BUSY signal from the high level to the low level after the process of stopping the SPI communication and the process of starting the UART communication using falling of the VSYNC signal to the low level as a trigger. The teleconverter performs a process of starting the UART communication using the falling edge of the INTR_BUSY signal to the low level as a trigger.

On the other hand, in a case where the INTR_BUSY signal is switched from the low level to the high level by the interchangeable lens 100 in the period in which the output signal level of the VSYNC terminal is a low level and the output signal level of the INTR_BUSY terminal is a low level (a period in which the UART communication can be performed between the interchangeable lens 100 and the teleconverter 300), the teleconverter performs the process of stopping the UART communication using rising of the INTR_BUSY signal to the high level as a trigger, and the camera body switches the VSYNC signal from the low level to the high level using rising of the INTR_BUSY signal to the high level as a trigger. The interchangeable lens performs the process of starting the SPI communication and the process of stopping the UART communication using the rising edge of the VSYNC signal to the high level as a trigger.

Exclusive switching between the SPI communication between the camera body 200 and the interchangeable lens 100 and the UART communication between the interchangeable lens 100 and the teleconverter 300 can be performed by switching the respective polarities of the INTR_BUSY signal and the VSYNC signal as described above.

In the embodiment, exclusive switching between the SPI communication between the camera body 200 and the interchangeable lens 100 and the UART communication between the interchangeable lens 100 and the teleconverter 300 is performed by switching between the polarities of the signals of the two specific terminals (the INTR_BUSY terminal and the VSYNC terminal), but the present invention is not limited thereto. Exclusive switching between the SPI communication between the camera body 200 and the interchangeable lens 100 and the UART communication between the interchangeable lens 100 and the teleconverter 300 occurs by switching between the polarities of the signal of one specific terminal (for example, the INTR_BUSY terminal). In this case, in order to guarantee the exclusive communication switching, it is preferable that the currently effective communication is stopped, and then, the stopped communication is started after a certain time has elapsed when switching between the polarities of the signals of the specific terminals occurs.

Further, the terminals used for communication switching are not limited to those in the embodiment, and may be terminals other than the power supply terminal and the input and output terminal, and any terminal may be used as long as the terminal is not used in a sequence for performing at least communication switching.

Further, the SPI communication is performed between the camera body 200 and the interchangeable lens 100, and the UART communication is performed between the interchangeable lens 100 and the teleconverter 300, but the present invention is not limited thereto and the communications may be the same type of serial communication.

Further, the present invention is not limited to the case in which the communication switching is used in the sequence of updating the firmware of the teleconverter 300. For example, the communication switching may also be used in a data area access (read and write) sequence of the flash ROM 326 in the teleconverter 300.

The above-described configurations and functions can be appropriately realized by any hardware, any software, or a combination of both. For example, the present invention can also be applied to a program causing a computer to execute the above-described processing steps (processing procedures), a computer-readable recording medium (a non-temporary recording medium) having such a program recorded thereon, or a computer in which such a program can be installed.

Although the examples of the present invention have been described above, it is obvious that the present invention is not limited to the above-described embodiments, and various modifications can be made without departing from the spirit of the present invention.

EXPLANATION OF REFERENCES

10: Imaging device
20: Optical finder window
22: Shutter release button
23: Shutter speed dial
24: Exposure correction dial
26: Eyepiece portion
27: MENU/OK key
28: Cross key
29: Playback button
100: Interchangeable lens
120: Lens-side CPU
200: Camera body
220: Body-side CPU
300: Teleconverter
320: Teleconverter-side CPU

What is claimed is:

1. A lens system including an interchangeable lens detachable and attachable from a camera body including a first mount having a plurality of first terminals including a power supply terminal and an input and output terminal for bidirectional serial communication, and an accessory mounted between the camera body and the interchangeable lens, wherein:
   the interchangeable lens includes
   a second mount having a plurality of second terminals respectively electrically connected to the plurality of first terminals arranged on the first mount via the accessory; and
   a lens control unit that performs bidirectional data communication with the accessory necessary for acquisition of at least identification information of the accessory before starting data communication with the camera body, and the accessory includes
- a third mount having a plurality of third terminals respectively connected to the plurality of first terminals in a state where the third mount is mounted on the first mount;
- a fourth mount having a plurality of fourth terminals respectively connected to the plurality of second terminals in a state where the fourth mount is mounted on the second mount;
- a plurality of signal lines that electrically connect the plurality of third terminals to the plurality of fourth terminals, respectively;
- an accessory control unit to which the power supply terminal and the input and output terminal among the plurality of signal lines are connected, the accessory control unit replying with identification information of the accessory when the accessory control unit receives a request for acquisition of the identification information of the accessory from the interchangeable lens,
- wherein the interchangeable lens includes a communication switching unit that determines whether or not a state capable of performing communication with the accessory is to be continued after acquiring identification information of the accessory on the basis of a polarity of a signal of specific terminals other than the power supply terminal and the input and output terminal among the plurality of second terminals corresponding to the plurality of first terminals, and performs communication switching between data communication between the camera body and the interchangeable lens and data communication between the interchangeable lens and the accessory using at least one of the specific terminals in a case where the state capable of performing communication with the accessory is continued.

2. The lens system according to claim 1, wherein in a case where there is a request for lens data from the camera body, the lens control unit transfers first lens data of the interchangeable lens optimized according to optical characteristics of the accessory to the camera body in a case where the identification information of the accessory is acquired, and transfers second lens data of the interchangeable lens to the camera body in a case where the identification information of the accessory is not acquired.

3. The lens system according to claim 2, wherein the specific terminal is a busy signal terminal for a busy signal for transferring a notification of an operation state from one of the interchangeable lens and the camera body to the other.

4. The lens system according to claim 2, wherein the specific terminal is a busy signal terminal for a busy signal for transferring a notification of an operation state from one of the interchangeable lens and the camera body to the other, and a synchronization signal terminal for a synchronization signal.

5. The lens system according to claim 1, wherein the specific terminal is a busy signal terminal for a busy signal for transferring a notification of an operation state from one of the interchangeable lens and the camera body to the other.

6. The lens system according to claim 1, wherein the specific terminal is a busy signal terminal for a busy signal for transferring a notification of an operation state from one of the interchangeable lens and the camera body to the other, and a synchronization signal terminal for a synchronization signal.

7. The lens system according to claim 6, wherein in a case where the communication switching unit detects that the polarity of the synchronization signal input from the synchronization signal terminal is a first polarity when power supply from the camera body is started, and switching from the first polarity to a second polarity different from the first polarity, the communication switching unit switches the first polarity of the busy signal for transferring a notification of an operation state from the interchangeable lens to the camera body to the second polarity different from the first polarity, and enables data communication between the interchangeable lens and the accessory in a period in which the synchronization signal has the second polarity and the busy signal has the second polarity.

8. The lens system according to claim 7, wherein the accessory control unit performs a communication end setting to disable data communication with the interchangeable lens when the accessory control unit detects that the busy signal is switched to the first polarity.

9. The lens system according to claim 7, wherein in a case where the accessory control unit unreceives a request for acquisition of the identification information of the accessory from the interchangeable lens within a predetermined period after the start of power supply from the camera body, the accessory control unit performs a communication end setting to disable data communication with the interchangeable lens.

10. The lens system according to claim 6, wherein the communication switching unit determines whether or not access to the accessory is to be continued, and switches the first polarity of the signal of the busy signal terminal to a second polarity different from the first polarity and enables the data communication between the interchangeable lens and the accessory in a case where the communication switching unit determines that the access is to be continued.

11. The lens system according to claim 10, wherein in a case where the communication switching unit detects that a polarity of a synchronization signal input from the synchronization signal terminal is the second polarity when power supply from the camera body is started, the communication switching unit switches a polarity of the signal of the busy signal terminal to the second polarity, and enables data communication between the interchangeable lens and the accessory.

12. A communication method of the lens system according to claim 1 including the interchangeable lens detachable and attachable from the camera body including the first mount having a plurality of first terminals including the power supply terminal and the input and output terminal for bidirectional serial communication, the interchangeable lens including the second mount having the plurality of second terminals respectively electrically connected to the plurality of first terminals arranged on the first mount via the accessory, and the accessory mounted between the camera body and the interchangeable lens, the communication method comprising:
- a step of transmitting, by the lens control unit of the interchangeable lens, a request for acquisition of identification information of the accessory before data communication with the camera body is started;
- a step of determining whether or not a state capable of performing communication with the accessory is to be continued after acquiring identification information of the accessory, and performing communication switching between data communication between the camera body and the interchangeable lens and data communication between the interchangeable lens and the accessory using at least one of the specific terminals in a case where the state capable of performing communication with the accessory is continued, by the communication switching unit; and a step of transmitting, by the accessory control unit of the accessory, the identification information of the accessory to the lens control unit when an acquisition request for the identification information of the accessory is received from the interchangeable lens.

13. The communication method according to claim 12, further comprising:

a step in which, in a case where data communication between the interchangeable lens and the camera body is enabled and there is a request for lens data from the camera body to the interchangeable lens, the lens control unit transfers first lens data of the interchangeable lens optimized according to optical characteristics of the accessory to the camera body in a case where the identification information of the accessory is acquired, and transfers second lens data of the interchangeable lens to the camera body in a case where the identification information of the accessory is not acquired.

14. A non-transitory recording medium readable by a computer for recording a program for the interchangeable lens, included in the lens system according to claim 1, detachable and attachable from the camera body including the first mount having the plurality of first terminals including the power supply terminal and the input and output terminal for bidirectional serial communication, the interchangeable lens including the second mount having the plurality of second terminals respectively electrically connected to the plurality of first terminals arranged on the first mount via the accessory and being mounted on the camera body directly or mounted on the camera body via the accessory, the program causing a computer in the interchangeable lens to realize a function of performing bidirectional data communication necessary for acquisition of at least identification information of the accessory before data communication with the camera body is started; and a function of determining whether or not a state capable of performing communication with the accessory is to be continued after acquiring identification information of the accessory, and performing communication switching between data communication between the camera body and the interchangeable lens and data communication between the interchangeable lens and the accessory using at least one of the specific terminals in a case where the state capable of performing communication with the accessory is continued.

15. The non-transitory recording medium readable by the computer for recording the program for an interchangeable lens according to claim 14, wherein the program causes the computer in the interchangeable lens to realize a function of transferring first lens data of the interchangeable lens optimized according to optical characteristics of the accessory to the camera body in a case where the identification information of the accessory is acquired, and transferring second lens data of the interchangeable lens to the camera body in a case where the identification information of the accessory is not acquired, in a case where data communication with the camera body is enabled and there is a request for lens data from the camera body.

16. An accessory that is mounted between a camera body including a first mount having a plurality of first terminals including a power supply terminal and an input and output terminal for bidirectional serial communication, and an interchangeable lens including a second mount having a plurality of second terminals that are respectively electrically connected to the plurality of first terminals arranged in the first mount, the accessory comprising:

a third mount having a plurality of third terminals respectively connected to the plurality of first terminals in a state where the third mount is mounted on the first mount;

a fourth mount having a plurality of fourth terminals respectively connected to the plurality of second terminals in a state where the fourth mount is mounted on the second mount;

a plurality of signal lines that electrically connect the plurality of third terminals to the plurality of fourth terminals, respectively; and an accessory control unit to which the power supply terminal and the input and output terminal among the plurality of signal lines are connected, the accessory control unit replying with identification information of the accessory when the accessory control unit receives a request for acquisition of the identification information of the accessory from the interchangeable lens, wherein the accessory control unit is connected to a signal line connected to the input and output terminal among the plurality of signal lines and a signal line connected to a specific terminal other than the power supply terminal and the input and output terminal, and performs a process of stopping data communication with the interchangeable lens or a process of starting the data communication with the interchangeable lens on the basis of a polarity of a signal of the specific terminal, wherein the specific terminal is a busy signal terminal for a busy signal for transferring a notification of an operation state from one of the interchangeable lens and the camera body to the other.

17. The accessory according to claim 16, wherein the specific terminal is a busy signal terminal for a busy signal for transferring a notification of an operation state from one of the interchangeable lens and the camera body to the other, and a synchronization signal terminal for a synchronization signal.

18. The accessory according to claim 16, wherein the accessory control unit performs a process of stopping data communication with the interchangeable lens in a case where the accessory control unit detects switching to a first polarity that is a polarity different from a second polarity that is a polarity of a busy signal input from the busy signal terminal, the busy signal transferring a notification of an operation state from the interchangeable lens to the camera body, and performs a process of starting data communication with the interchangeable lens when the accessory control unit detects switching to the second polarity.

19. The accessory according to claim 16, wherein in a case where the accessory control unit unreceives a request for acquisition of identification information of the accessory from the interchangeable lens within a predetermined period after start of power supply from the camera body, the accessory control unit performs a communication end setting to disable data communication with the interchangeable lens.

20. The accessory according to claim 16, wherein the accessory is a teleconversion lens, a wide conversion lens, an antivibration adapter, a macro extension tube, or a mount adapter.

* * * * *